United States Patent
Capalija et al.

(10) Patent No.: US 12,236,237 B2
(45) Date of Patent: Feb. 25, 2025

(54) PROCESSOR CORES USING CONTENT OBJECT IDENTIFIERS FOR ROUTING AND COMPUTATION

(71) Applicant: Tenstorrent Inc., Toronto (CA)

(72) Inventors: Davor Capalija, Cupertino, CA (US); Ljubisa Bajic, Toronto (CA); Jasmina Vasiljevic, Cupertino, CA (US); Yongbum Kim, Los Altos Hills, CA (US)

(73) Assignee: Tenstorrent Inc., Toronto (CA)

( * ) Notice: Subject to any disclaimer, the term of this patent is extended or adjusted under 35 U.S.C. 154(b) by 187 days.

(21) Appl. No.: 18/129,808

(22) Filed: Mar. 31, 2023

(65) Prior Publication Data

US 2023/0236831 A1     Jul. 27, 2023

Related U.S. Application Data

(63) Continuation-in-part of application No. 17/686,003, filed on Mar. 3, 2022, now Pat. No. 11,829,752, which is a continuation of application No. 16/902,035, filed on Jun. 15, 2020, now Pat. No. 11,269,628.

(60) Provisional application No. 62/863,042, filed on Jun. 18, 2019.

(51) Int. Cl.
    *G06F 9/30*     (2018.01)
    *G06F 8/41*     (2018.01)
    *G06F 15/80*    (2006.01)

(52) U.S. Cl.
    CPC ............... *G06F 9/30* (2013.01); *G06F 8/427* (2013.01)

(58) Field of Classification Search
    CPC ... G06F 9/30; G06F 9/34; G06F 8/427; G06F 15/8046; G06F 15/82; G06N 3/063; H04L 49/25; H04L 45/74
    See application file for complete search history.

(56) References Cited

U.S. PATENT DOCUMENTS

| | | |
|---|---|---|
| 6,453,360 B1 | 9/2002 | Muller et al. |
| 6,650,640 B1 | 11/2003 | Muller et al. |
| 8,001,266 B1 * | 8/2011 | Gonzalez ............ G06F 15/177 370/351 |
| 2003/0108053 A1 | 6/2003 | Inaba |

(Continued)

OTHER PUBLICATIONS

Notice of Allowance dated Oct. 17, 2023 from U.S. Appl. No. 17/686,003, 7 pages.

(Continued)

*Primary Examiner* — Jacob Petranek
(74) *Attorney, Agent, or Firm* — Daylight Law, P.C.

(57) ABSTRACT

Processor cores using content object identifiers for routing and computation are disclosed. One method includes executing a complex computation using a set of processing cores. The method includes routing a set of content objects using a set of content object identifiers and executing a set of instructions. The set of instructions are defined using a set of operand identifiers. The operand identifiers represent content object identifiers in the set of content object identifiers. The content objects can be routed according to a named data networking (NDN) or content-centric networking (CCN) paradigm with the content object identifiers mentioned above serving as the names for the computation data being routed by the network.

20 Claims, 11 Drawing Sheets

(56) References Cited

U.S. PATENT DOCUMENTS

| | | |
|---|---|---|
| 2004/0250046 A1 | 12/2004 | Gonzalez et al. |
| 2005/0108518 A1 | 5/2005 | Pandya |
| 2005/0226238 A1 | 10/2005 | Hoskote et al. |
| 2008/0215820 A1* | 9/2008 | Conway ................ G06F 12/082 |
| | | 711/E12.017 |
| 2009/0016355 A1 | 1/2009 | Moyes |
| 2012/0185633 A1 | 7/2012 | Sano |
| 2014/0029616 A1 | 1/2014 | Chang et al. |
| 2014/0052923 A1 | 2/2014 | Ikeda |
| 2015/0319086 A1 | 11/2015 | Tripathi et al. |
| 2016/0294710 A1 | 10/2016 | Sreeramoju |
| 2017/0242697 A1 | 8/2017 | Baghsorkhi |
| 2017/0302530 A1 | 10/2017 | Wolting |
| 2017/0315726 A1* | 11/2017 | White ..................... G06F 3/061 |
| 2018/0139153 A1* | 5/2018 | Moradi .................. G06N 3/049 |
| 2019/0286972 A1 | 9/2019 | Husseini et al. |

OTHER PUBLICATIONS

Non-final Office Action from U.S. Appl. No. 17/686,003 dated May 3, 2023, 11 pages.

Extended European Search Report dated Dec. 23, 2020 from European Application No. 20179923.6, 8 pages.

First Office Action from Chinese Application No. 202010557993.8 dated Sep. 5, 2022, 9 pages.

Hayashi et al., "Parallelization in an HPF Language Processor", NEC Research and Development, Nippon electric Ltd. Tokyo, JP, vol. 39, No. 4, Oct. 1, 1998, pp. 414-421.

Astovetsky, "Parallel Computing on Heterogeneous Networks", XP055759409, Hoboken, NJ, Retrieved from the Internet: URL:https://citeseerx.ist.psu.edu/viewdoc/download?doi=10.1.1.216.8140&rep=rep1&type=pdf, Jan. 1, 2003, 48 pages.

Notice of Allowance dated Dec. 30, 2021 from U.S. Appl. No. 19/902,035, 49 pages.

Second Office Action from Chinese Application No. 202010557993.8 dated Jan. 19, 2023, 4 pages.

Tanguy E. Raynaud et al., "A Cache Only Memory Architecture for Big Data Applications", Technical Report No. 8, Jul. 1, 2014, 36 pages.

Extended European Search Report dated Aug. 16, 2024 from European Application No. 24167397.9, 9 pages.

\* cited by examiner

NoC 100

800

850

PROCESSOR CORES USING CONTENT OBJECT IDENTIFIERS FOR ROUTING AND COMPUTATION

CROSS REFERENCE TO RELATED APPLICATIONS

This application is a continuation-in-part of U.S. patent application Ser. No. 17/686,003, filed Mar. 3, 2022, which is a continuation of U.S. patent application Ser. No. 16/902,035, filed Jun. 15, 2020, which claims the benefit of U.S. Provisional Patent Application No. 62/863,042, filed Jun. 18, 2019, all of which are incorporated by reference herein in their entireties for all purposes.

BACKGROUND

As the field of computing has begun to see diminishing returns from a reliance on frequency scaling to improve computational performance, parallel computing has become an increasingly important field of study and opportunity for commercialization. Parallel computing relies on the capability of a computer architecture to break a complex computation into a set of composite computations that can be executed simultaneously, in parallel, by multiple processing nodes. Although this capability is not universal to all potential workloads, enough complex computations can be parallelized in this fashion to render parallel computing the current dominant paradigm for computer architectures.

Parallel computing exhibits certain drawbacks in terms of the increased complexity of breaking down a complex computation into a set of composite computations that can be executed in parallel, and the communication and synchronization between the various computational nodes as they cooperatively execute the complex computation. The communication problem includes not only transmitting the results of the various composite computations so that they can be aggregated to build towards a final result, but also the physical communication of instructions to the various computational nodes so that they know which composite computations they need to calculate. The increased complexity requires a system that not only handles the data computations associated with the complex computation itself but also computations for addressing, packing, storing, and moving the data and instructions that support the complex computation.

In the specific field of multi-core processors, in which the computational nodes are individual processing cores of the multi-core processor, one common system deployed for distributing data amongst the various cores is a network-on-chip (NoC). Each computational node in such a system includes both hardware to conduct computations, in the same manner as for a traditional computer processor, and additionally includes a network interface unit (NIU) and router for managing the movement of data amongst the various processing cores.

FIG. 1 illustrates a portion of a NoC 100 for a multicore processor with four processing cores 101, 102, 103, and 104. The illustrated processing cores are linked using four routers 110, 111, 112, and 113. The processing cores and routers form nodes of the system. The routers communicate with their associated processing core using an NIU located on each processing core. Data used in the execution of instructions by the pipelines of the processing cores 101, 102, 103, and 104 is stored in the memory on each core. The data can include instructions and the values for operands used in the execution of the instructions. When an instruction is executed, that operand data is accessed from the memory, and the computation result is stored back in the memory. When the data stored in the memory is needed on another processing core, the NIU works in combination with the router to package the data, copy the data, and transmit the data through the NoC to another node.

SUMMARY

Methods and systems related to the efficient distribution of a complex computation among multiple computational nodes are disclosed herein. The multiple computational nodes can be processing cores. The multiple computational nodes can be referred to as a network of computational nodes. The computational nodes can each include a router and a processing pipeline. The router of each computational node can be used to route data between the computational node and the other computational nodes in the network. The processing pipeline of each computational node can conduct component computations of the complex computation. The data routed between the computational nodes can be input, intermediate, or output data for the complex computation which is referred to herein as computation data. The computation data can also include instructions on how to conduct the complex computation which are referred to herein as computation instructions.

In specific embodiments of the invention, the network of computational nodes can be configured to obviate the need to reassemble higher level data structures on each of the computational nodes. In these embodiments, data is routed through the network of nodes using the same degree of abstraction from the underlying complex computation as is used by the computational pipeline of each computational node. The resulting network can save resources that would otherwise have been spent packaging, routing, and translating data and spend those resources on conducting the actual computations required for the complex computation which the nodes have been assigned. In these embodiments, the data can be routed using lower level data units, such as packets, and computations can be conducted by the computational nodes using the same lower level data structures. The same data structures can therefore be used to transport, store, and conduct computations across the computational network.

In specific embodiments of the invention, the computation data can be packaged into content objects for both routing between the computational nodes via the routers and computation on the computational nodes via the processing pipelines. In specific embodiments, the packetization into content objects decreases the latency and improves the performance of a distributed computation system because large data structures, such as large tensors, can be broken into smaller pieces and computation can begin as soon as those smaller pieces are received, instead of waiting for the entire tensor to be loaded into memory on a given computational node. In specific embodiments, the size of the content objects can be altered during execution of the complex computation. The resulting complex computation in content objects can be executed with a higher degree of parallelization due to this heightened degree of flexibility. At different times, the same network can break computation data into smaller more numerous pieces to take advantage of a higher degree of parallelization in a complex computation, and then break the same computation data into larger less numerous pieces if the overhead of parallelization is not amenable to certain portions of the same complex computation, or to a different complex computation for which the same network is being applied.

In specific embodiments of the invention, the operand identifiers represent content object identifiers in the set of content object identifiers. The representation of content object identifiers by operand identifiers can be the result of using common labels between the two sets or a mapping between the two sets of labels. The representation of content object identifiers by operand identifiers could also be a result of a set of memories on the set of processing cores storing data values in common association with both the set of content objects and a set of operands identified by the set of operand identifiers. For example, a memory storing data on a processing core could include a set of memory addresses that are accessed for moving operand data to and from the processing pipeline while the same addresses are accessed for moving routed data to and from other processing cores. Those memory addresses could be accessed using a correspondence between a set of labels associated with the content objects and a set of labels associated with the operands. However, those memory addresses could also be accessed using a synchronized correspondence embedded in the execution of the complex computation itself by which a processing core would know to access a given memory address for an operand and to read from that same given memory address for routing the data to another processing core.

In specific embodiments of the invention, the computation data is represented using the same degree of abstraction by the routers and processing pipelines by labeling the data routed between the computational nodes and the data upon which the processing pipeline operates using a common language. The common language can be a set of labels that are used to both route the data between computational nodes and execute computations on the processing pipelines. For example, a router associated with each computational node could identify data units using a set of data unit identifiers and a processing pipeline associated with each computational node could refer to those same units of data using that same set of data unit identifiers.

In specific embodiments of the invention in which the computation data is put into content objects, the labels mentioned in the prior paragraph could be content object identifiers. The data units could be content objects such that the router referred to them using content object identifiers, while the processing pipeline also used the content object identifiers. In specific embodiments of the invention, the processing pipeline could use a set of operand identifiers that was in the set of content object identifiers. In specific embodiments of the invention, the processing pipeline could use a set of operand identifiers that represent the content object identifiers.

In specific embodiments of the invention, the same degree of abstraction could be realized through the use of a mapping from: (i) a set of labels used to route computation data between computational nodes and a set of labels used to execute computations on the processing pipeline using that computation data; back to (ii) an underlying set of data units associated with the complex computation. For example, the complex computation could be described at a high level of abstraction by using a reference to a set of application datums and the sets of labels mentioned above could each be unambiguously mapped back to the same set of application datums. In specific embodiments of the invention, the unambiguous mapping from the labels to the application datums will remain globally unambiguous, across the processing cores, throughout the execution of the complex computation.

The mapping can be kept globally unambiguous through mutually exclusive temporal use of a given label, through the use of mutually exclusive labels, through the mutually exclusive localized use of a given label, or any combination of these approaches.

In specific embodiments of the invention, the computational nodes are processing cores and the complex computation is the execution of a directed graph. The processing cores can each have a processing pipeline, a memory, and a router. In these embodiments, the network can include the routers, inter-processor buses, and a multi-core data routing protocol such as a proprietary network on chip (NoC) protocol. However, the computational nodes could be any type of computational unit at any scale including artificial neurons, CPUs, GPUs, ASICs, FPGAs, server blades, servers, or computing clusters. Furthermore, the computational nodes do not need to be co-located on a single board or even in a single locale and can be located in entirely different physical locales. Furthermore, the protocol used to route data between the computational nodes can be any networking protocol that is compatible with the computational nodes including RDMA, RoCE, PCIE, HyperTransport, InfiniBand, Ethernet, UDP, TCP/IP, IEEE 802.11, GPRS, or any other wired or wireless packet-based network protocol.

In specific embodiments of the invention, computation data is routed through a network of computational nodes using at least one of request messages and solicitation messages transmitted through the network where the request messages and solicitation messages refer to the computation data. In specific embodiments of the invention, the request and solicitation messages refer to the data using the content object identifiers mentioned herein. In specific embodiments of the invention, the request and solicitation messages refer to the data using labels that unambiguously map to the application datum identifiers mentioned herein. In these embodiments, the computation data could be routed through the network of computational nodes without the network needing to register or orchestrate, ex ante, where the computational data should be routed to and where the computational data needs to be routed from. In these embodiments the computation data could be routed according to a named data networking (NDN) or content-centric networking (CCN) paradigm with the content object identifiers mentioned above serving as the names for the computation data being routed by the network.

In specific embodiments of the invention a method in which each step is conducted by a set of processing cores executing a complex computation is provided. The method comprises indirectly transmitting, from a first processing core in the set of processing cores to a second processing core in the set of processing cores, a request message having a content object identifier. The method further comprises receiving, at the second processing core in the set of processing cores, the request message. The method further comprises directly transmitting, from the second processing core to the first processing core, a message containing a content object in response to receiving the request message. The method further comprises buffering the content objects on a memory on the first processing core using a memory address. The method further comprises obtaining the content objects from the memory using an operand identifier. The method further comprises executing an instruction using a processing pipeline on the first processing core. The instruction includes the operand identifier.

In specific embodiments of the invention another method in which each step is conducted by a set of processing cores executing a complex computation is provided. The method comprises indirectly transmitting, from a first processing core in the set of processing cores, a solicitation message having a content object identifier. The method further comprises receiving, at a second processing core in the set of processing cores, the solicitation message. The method further comprises directly transmitting, from the second processing core to the first processing core, a request message in response to receiving the solicitation message. The method further comprises receiving, at the first processing core in the set of processing cores, the request message. The method further comprises directly transmitting, from the first processing core to the second processing core, a content objects in response to receiving the request message. The method further comprises buffering the content objects on a memory on the second processing core using a memory address. The method further comprises obtaining the content objects from the memory using an operand identifier. The method further comprises executing an instruction using a processing pipeline in the set of processing cores. The instruction includes the operand identifier.

DETAILED DESCRIPTION

Methods and systems related to the efficient distribution of complex computations between multiple computational nodes in accordance with the summary above are disclosed in detail herein. The methods and systems disclosed in this section are nonlimiting embodiments of the invention, are provided for explanatory purposes only, and should not be used to constrict the full scope of the invention. Throughout this disclosure the example of a computational node, in the form of a processing core, which is executing a complex computation, in the form of a directed graph, is utilized as an example. However, and as mentioned in the summary, the computational nodes can be any networked computational unit, and the complex computation can be drawn from any field which requires numerous computations to be rapidly and efficiently executed in parallel by multiple computational units.

The processing cores mentioned in this portion of the description include a router, processing pipeline, and a memory. However, they could also include additional or more specific elements such as a higher-level controller, serializer/deserializer, nonvolatile memory for modifiable configuration information, a volatile memory such as an SRAM, and any number of arithmetic logic units and other fundamental computation units. The processing cores can also include a network on chip (NoC) layer for interfacing with the remainder of the processing cores. The NoC layer could allow the processing core to push data to the correct core or obtain data therefrom. The NoC layer could be a software layer built to interoperate with an existing processing core router. Alternatively, the NoC layer could be a customized hardware device serving as the router itself. In embodiments in which the computation data is packetized into content objects, the processing pipeline can include a bus for accessing the memory, an unpacking block, a computation block, a packing block, and another bus for writing to the memory.

The complex computations disclosed herein can include the execution of a directed graph. The directed graph can be described using application code (e.g., a source code description of an algorithm). The directed graph can represent a machine learning algorithm such as an artificial neural network (ANN) or support vector machine. The directed graph can also represent a hashing, encryption, decryption, or graphics rendering algorithm involving a large number of component computations. In particular, the directed graph can represent algorithms requiring a high level of parallel processing such as a ray casting algorithm.

Figure 1:
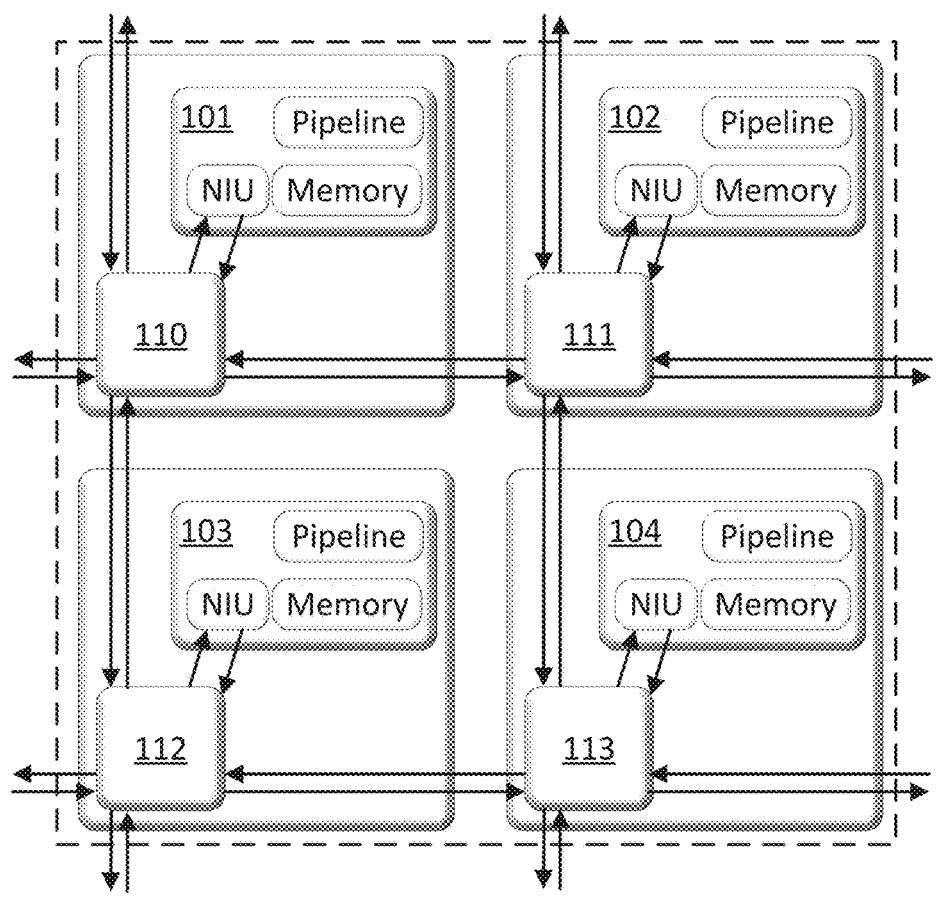
FIG. 1 is a block diagram of a portion of a NoC connecting multiple processing cores in a multicore processor in accordance with the related art.
Figure 2:
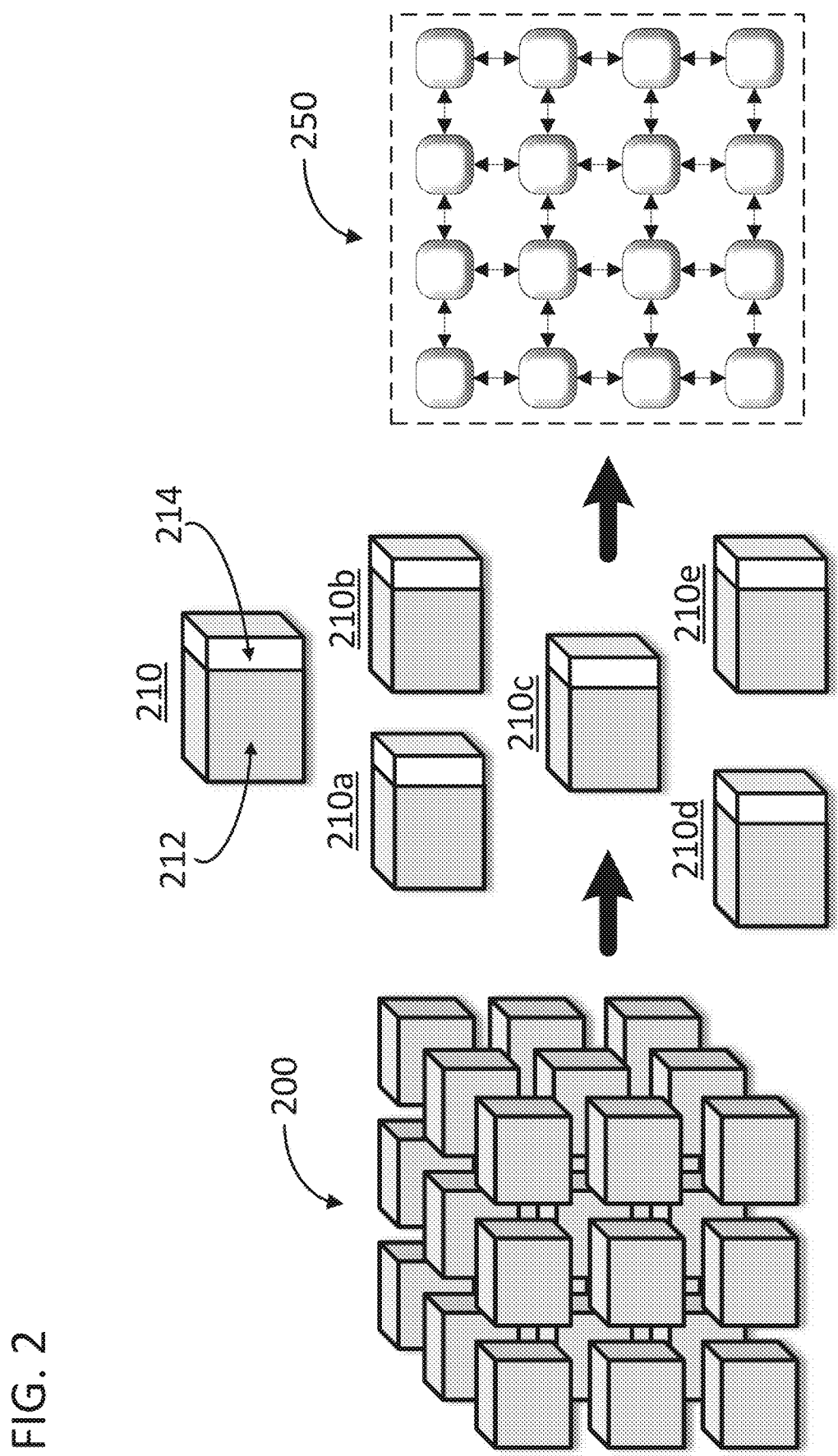
FIG. 2 is an illustration of the packetization of large tensors of computation data into a set of content objects for the distribution of a complex computation among a network of processing cores in accordance with specific embodiments disclosed herein.

FIG. 2 illustrates a set of computation data 200 in the form of 27 massive tensors. In the case of the complex computation being the execution of a directed graph that represents an ANN, the tensors can be multidimensional data structure each with a number of individual datums on the order of millions or billions. In accordance with specific embodiments disclosed herein, those tensors can be packetized by being divided into a large number of content objects, such as content objects 210, 210a, 210b, 210c, 210d, 210e, each having a payload 212, containing computation data, and a header 214, which can include data used to identify and describe the payload of the packet. As described herein, these content objects 210 can then be used to execute the complex computation. In the illustrated case the complex computation includes the execution of a directed graph representing an ANN using a network of processing cores 250. In particular, the execution of the directed graph includes the generation of an inference from the ANN. Throughout the execution of the complex computation, the content objects, such as content objects 210, can serve as the main unit of exchange, storage, and computation across the network of processing cores, such as network of processing cores 250. In specific embodiments of the invention, the header, such as header 214, can include a content object identifier used to refer to the packet for purposes of exchange, storage, and computation across the network of processing cores. In these embodiments, the processing pipelines and routers of all the processing cores can all refer to the content objects at the same level of abstraction (e.g., the content object identifiers).

Figure 3:
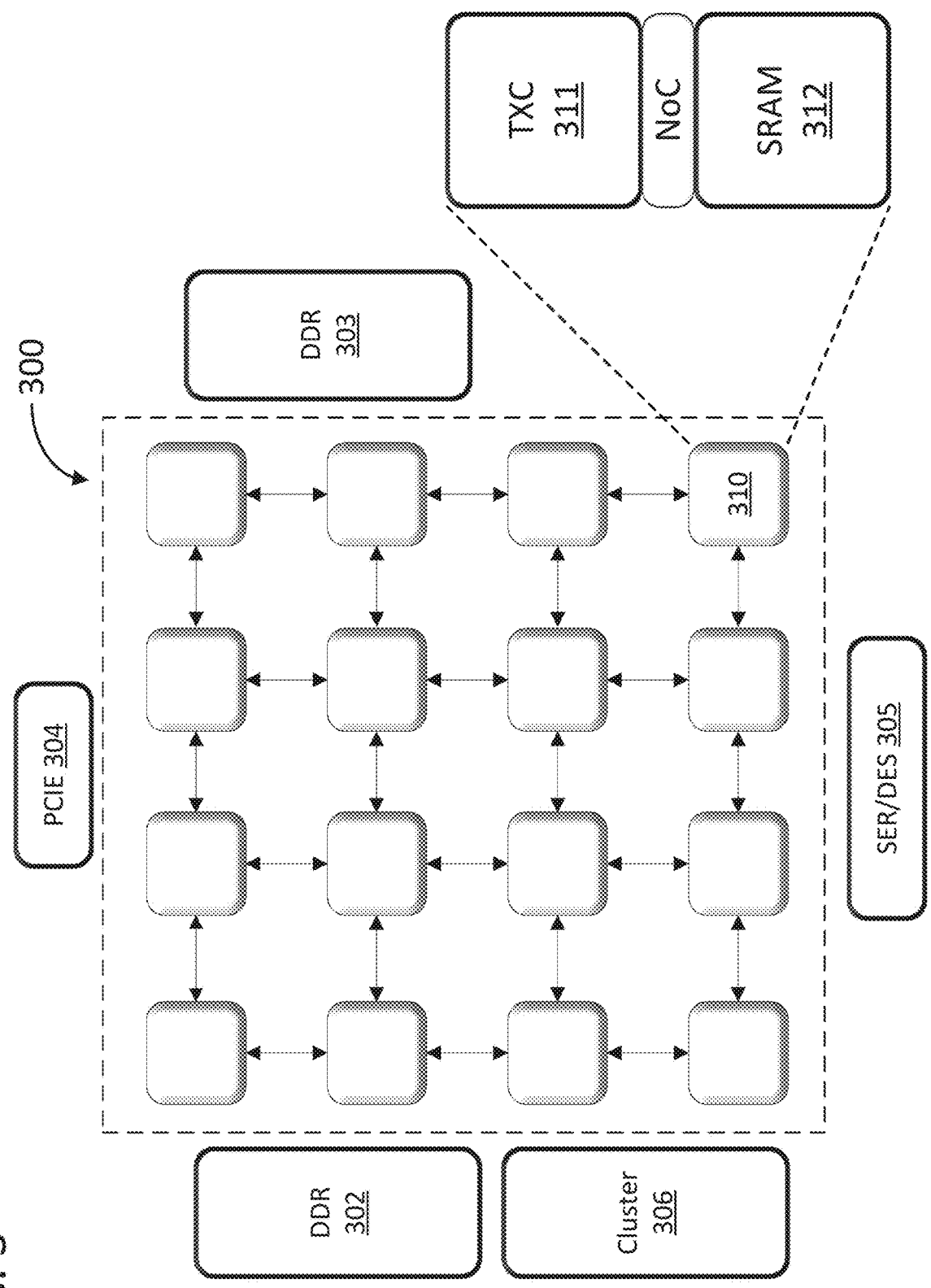
FIG. 3 is a block diagram of a network of processing cores in accordance with specific embodiments disclosed herein.

In specific embodiments of the invention, a network of computational units can include a set of processing cores located on a single chip and networked via a mesh of buses or interconnect fabric and a set of routers on each of the processing cores communicating via a proprietary NoC protocol. FIG. 3 illustrates a set of processing cores 300 on a single chip along with peripheral support circuitry. In the example of FIG. 3, peripherical support circuitry is illustrated as Double Data Rate (DDR) memories 302 and 303, Peripheral Component Interconnect Express (PCIE) interface 304, Serializer/Deserializer 305, and cluster 306, that can be for example a 4 core ARC cluster. However, the peripheral support circuitry can include any component necessary for supporting the overall processing. The processing cores each can have a router and are able to unicast or broadcast commands and data on the mesh of buses. Each processing core can push or pull data from one or multiple cores in the mesh. In specific embodiments of the invention, the push or pull of data on the mesh of buses is orchestrated at the content object level with commands and requests referring to computation data via content object identifiers. In specific embodiments of the invention, the content object identifiers are globally unique across a set of cooperating computational nodes. For example, a single processing core in the network shown in FIG. 3 could thereby be able to broadcast a request for a specific content object of computational data without knowing anything about where the data was stored on the network. Numerous additional advantages accrue to approaches in which the content object identifiers are globally unique and unambiguous across the network.

The processing cores in FIG. 3 can include a low-level transmission control (TXC) layer, represented by TXC 311 in processing core 310. The low-level transmission control can include a router in the form of a set of buffers, an allocator, and a configurable cross bar. The processing core can also include a NoC layer implemented in hardware or software and responsible for the higher-level routing and flow control logic of the NoC. The processing cores can also include a local memory, such as SRAM 312 in processing core 310 in FIG. 3, where data is written to/read from for interfacing with the network. The memory, such as SRAM 312, can be the main memory of the processing core and can be accessed by the processing pipeline and the NoC layer. The NoC layer and processing pipeline can access the memory using identifiers that are unambiguously mapped to an underlying set of application datums. The NoC layer and processing pipeline can access a set of memory addresses that are each commonly mapped to identifiers used by the NoC layer and identifiers used by the processing pipeline. The identifiers can be physical labels in data or the emergent result of the synchronized execution of a complex computation by the set of processing cores.

In keeping with the example of FIG. 2, computation data can be stored in packetized content objects that are routed among the different processing cores and utilized by the computational pipeline using a description of the computation data at the same level of abstraction. For example, a tensor of the complex computation could be a portion of a weight tensor "W1" and a component computation of the complex computation could be a convolution between W1 and a portion of an activation tensor "A1." In this example, and assuming that said component computation was being assigned in its entirety to a single processing core, both the router and processing pipeline of that processing core could refer to the two units of computation data as "W1" and "A1," with the router responsible for receiving A1 from another processing core, while the processing pipeline was responsible for retrieving W1 and A1 from the internal memory of the processing cores, executing the convolution, and storing the result back in to memory.

In specific embodiments of the invention, the memories of the processing cores can store routines for executing instructions. The instructions can be specified according to one or more operands and an operation code. In keeping with the example above of the convolution between tensors W1 and A1, the instruction would be an identification of the operation "convolution" and an identification of the two operands "W1" and "A1." The identification of the operation could be specified using an operation code as that term is used by those of ordinary skill in the art. The operations could also be convolutions, matrix multiplications, concatenations, tensor slices, Hadamard products calculations, tensor flatten calculations, tensor transpose calculations, and other computations. The specific set of instructions the processing core is configured to execute can depend on the applications the processing core is optimized for with the aforementioned list of instructions being amenable to use in the execution of a directed graph representing an ANN. The processing pipeline can take in both data and instructions from the memory in order to execute those operations, and then store the output in the memory.

In specific embodiments of the invention, the routers of the processing core can route data using labels for the data. For example, the data could be provided with a data identifier and the data identifier could be used to send requests for data to other processing cores, to send data for a specific core, or to broadcast data to every core in the system. In embodiments in which the computation data was packetized, the labels could be content objects headers and the data identifiers could be content object identifiers.

In specific embodiments of the invention, both the router and the processing pipeline of the processing cores can refer to the data of the complex computation at the same level of abstraction to increase the performance of the overall system by limiting the need for translation and other steps. In particular, the processing pipeline can use operand identifiers for the operands of the operations it will conduct that represent the data identifiers that are used by the router to move data through the system. In embodiments in which the computation data was packetized, the identifiers used in this manner could be content object identifiers. For example, if the complex computation were the execution of a directed graph representing an ANN, the computation data in the form of weights, inputs, outputs, and accumulation values could be stored as the payload of content objects and the header of the content objects could include a content object identifier associated with that computation data. Once the data of the complex computation was packetized both the router and the processing pipeline could conduct operations using reference to the same content objects. The content object identifiers could, of course, be used by the router to identify content objects coming and going from the router, but the content object identifiers could likewise be used by the computational pipeline to retrieve data from memory to conduct operations thereon. The operand identifiers could represent the content object identifiers either directly, by being identical, or indirectly, by being related through a mapping. Such a mapping could be local to the processing core or global to a set of processing cores conducting a computation. The mapping could also be an actual data structure stored in memory or it could be represented by a basic translation implemented in logic such as a conversion from binary coded numerals to true binary.

The manner in which a computational pipeline uses the content objects can depend on the architecture of the pipeline and other factors. In a basic example, the string of data used by a router to label a portion of computation data will be identical to a string of data used by a processing pipeline as a label to identify that same portion of computation data. Effectively, in these embodiments a set of operand identifiers will be in the set of content object identifiers for a given complex computation such that using the processing pipeline can use the content object identifiers in the same way that it uses operand identifiers to retrieve data from memory. The memory can be a cache memory on a processing core such as SRAM 312. Specifically, the processing pipeline will store the computation data at a specific address in the memory on the processing core and store that address in association with the content object identifier. When an instruction includes an operand with that content object identifier, the processing core will retrieve the data stored at the associated address. In other examples, a mapping such as the one described above can be utilized in order to retrieve the correct data for a given operation while the content object identifier is still used in order to initiate the access of the data via the mapping. In other examples, the operand identifiers used by the processing pipeline will be themselves memory addresses in the memory and the content object identifiers will be used to assure that the network delivers the data to that same memory address prior to execution of the instruction. The routing system, such as the NoC layer can throw a flag to indicate that the data is available at the memory location when the content object has been written to the memory. In other examples, the NoC layer can deliver the memory address to a processing core controller when the data is written to the memory.

Embodiments in which the computational data is packetized exhibit certain benefits. As mentioned above, packetizing allows for large data structures to be broken into smaller pieces upon which computations can be executed before the entire data structure has been received by a computational node. In addition, as stated previously, packetizing in flexibly sized content objects can allow a set of processing cores to modify the degree of parallelization being utilized for a given computation at a given time based on the immediate characteristic of the computation. Furthermore, packetizing allows different kinds of data structures to be used to store the computational data at the same time without creating conflicts. As the content objects become discrete entities in their own right, the same data structure can be partially represented using two data types by simply placing them in different content objects. The computational side of the system can also benefit from this siloing of data in that it is easy to keep track of which types of computational hardware need to be utilized for conducting operations on which content objects. For example, if it is determined that one weight tensor W2 is more influential on the output of a given complex computation than another weight tensor W3, W2 can be stored in a content object with high resolution datums such as 16-bit floating point while W3 is stored in a content object with lower resolution datums such as 8-bit integer. The resolution of different content objects can also be modified at run time using this approach. The header of the content object can be updated by the processing pipeline to reflect this change.

Figure 4:
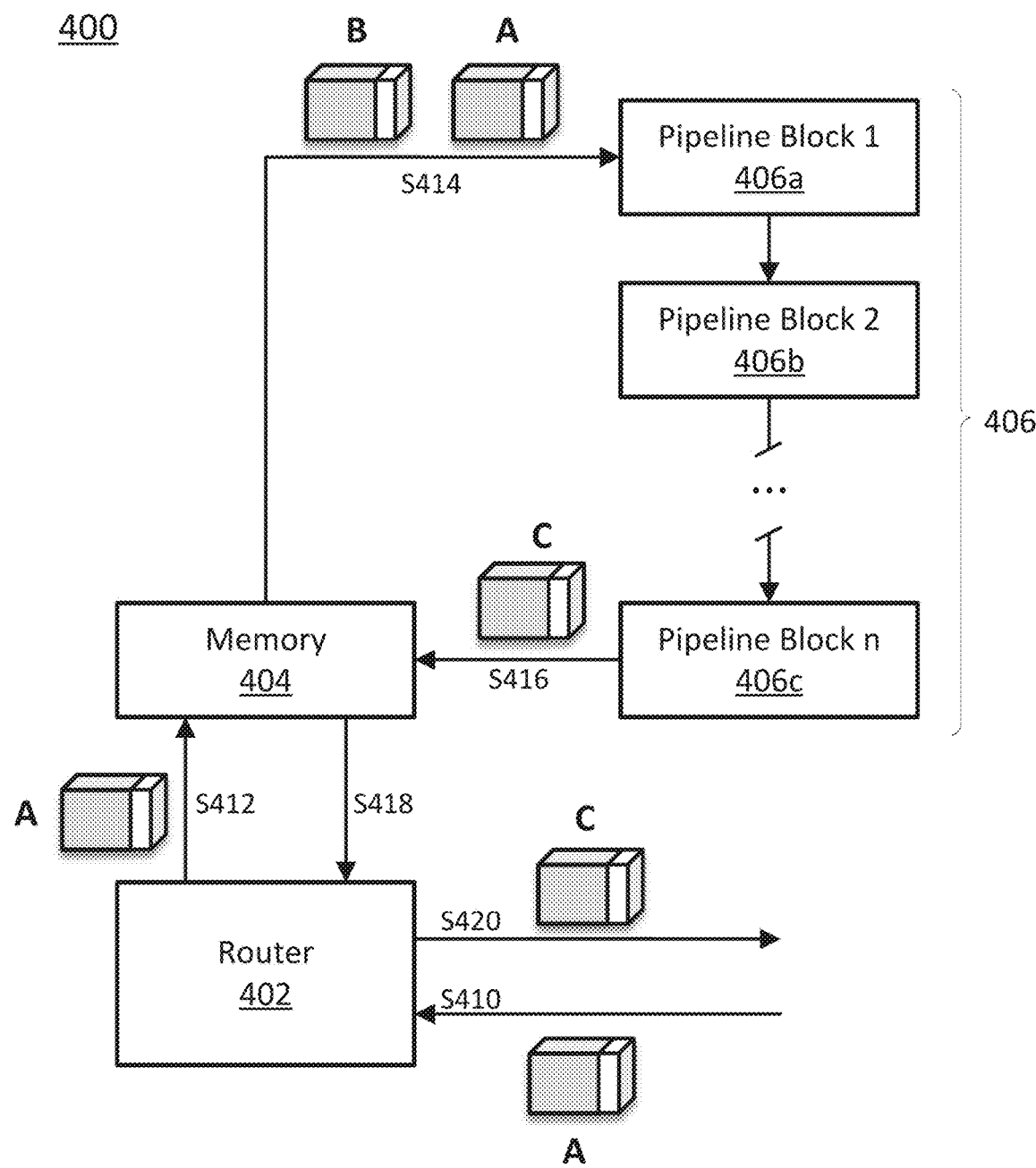
FIG. 4 is a block diagram of a computational node in the form of a processing core in accordance with specific embodiments disclosed herein.

FIG. 4 provides a block diagram 400 of a processing core, such as processing core 310 of FIG. 3, that is in accordance with specific embodiments of the invention disclosed herein. As seen, the processing core includes a router 402, a memory 404, and a processing pipeline 406, represented by a plurality of "n" pipeline blocks 406*a*, 406*b*, and 406*c*. The router 402 can store received content objects in memory 404 and pull content objects from the memory 404 for transmission to other processing cores. As illustrated, the router 402 is receiving a content object "A" in step S410, and storing it in memory 404 in step S412. The memory 404 can store the data for content object A along with a content object identifier for content object A by writing the content object identifier into a specific address in memory known to the processing pipeline 406 and router 402 to reflect the content of the memory address in which the content object data was stored. The memory 404 can store data for the processing pipeline 406 to conduct operations upon as well as instructions for administrating various operations on that data. The processing pipeline 406 can include basic circuit elements such as registers, latches, and logic gates as well as more complex structures such as floating-point arithmetic logic units. The lines in the figure can be buses which may be able to transport more than one content object at a given time. The processing pipeline 406 can receive content objects from memory 404 and process them in accordance with operation codes stored in memory and written in a program for the processing pipeline to execute. As illustrated, the processing pipeline 406 can receive content objects A and B from memory 404 in step S414, and can execute an operation, such as a convolution, between the data in content object A and content object B and create a new content object C for storage in the memory 404, as illustrated in step S416. The new content object C can then be accessed by the router 402 for transmission elsewhere in the network as needed, as illustrated in steps S418 and S420.

In specific embodiments of the invention in which the computation data is packetized into content objects, the processing pipeline can manipulate the content object in various ways. The processing pipeline could retrieve the content object, including the content object and header from memory, the processing pipeline could then modify the payload or header of the content object while conducting an operation using the content object, and then store the content object, with the same content object identifier, back into memory. For example, the processing pipeline could compress or decompress the data in the content object, encrypt or decrypt the data in the content object, alter the data type of the content object (e.g., 16-bit floating point to 8-bit integer), or analyze the data in the payload and add a description of the payload to the header. Additional data in the content object header could be modified to indicate the status of the content object as being compressed or decompressed etc. Alternatively, the processing pipeline could use the content object to create a new content object. The processing pipeline could accordingly retrieve the content object from memory, conduct an operation such as a concatenation with another content object, slice operation, or math operation with another content object, and then store a new content object with the resulting data, using a different content object identifier, back into memory. The different content object identifier could be specified in a computation instruction delivered to the processing core. For example, with reference to FIG. 4, the computation instruction could be: "C=A convolution B" which would serve as an instruction to assign the content object identifier "C" to the product of the operation "convolution" with operands "A" and "B." Various operations can be substituted in place of the convolution operation as described above including the identify operation in which the content of one content object would be loaded into the content of a new content object or replace the content of an existing content object.

In specific embodiments of the invention, various stages of the processing pipeline can be configured to execute the various operations described above. For example, a first stage of the processing pipeline could be configured to unpack a content object of computation data and a corresponding final stage of the processing pipeline could be configured to pack either the same or a new content object of computation data. Stages such as the ones described in the prior example could be dedicated for a specific operation and either conduct the operation or not depending upon the status of the incoming data to that stage of the pipeline. For example, a decryption block could be configured to pass through incoming data in a content object if the content object header indicated the data was already in a decrypted state. Additionally, or in the alternative, various stages of the processing pipeline could be configured to execute multiple operations based on the instruction being executed by the pipeline at a given moment. For example, an ALU or FPU could be configured to add, subtract, or conduct more complex operations on a set of input computation data based on a control signal applied to that stage of the pipeline. As another example, a data conversion stage could be configured to alter incoming data into various formats based on a control signal applied to that stage of the pipeline.

In specific embodiments of the invention, matched pairs of processing blocks on either side of the main computation portion of the pipeline could be utilized. The matched pairs of processing blocks on either side of the main computation blocks could include pairs of encryption and decryption blocks, pairs of compression and decompression blocks, pairs of pack and unpack blocks, and other sets of matched operations that put the computation data in a format amenable to computation and storage/transmission respectively. For example, the concept of decompressing and compressing the computation data at these stages is particularly appealing given the fact that the data will have been stored and routed through the system all the way until it is on the verge of being applied to the processing pipeline and will then be compressed immediately after it has been utilized.

Figure 5:
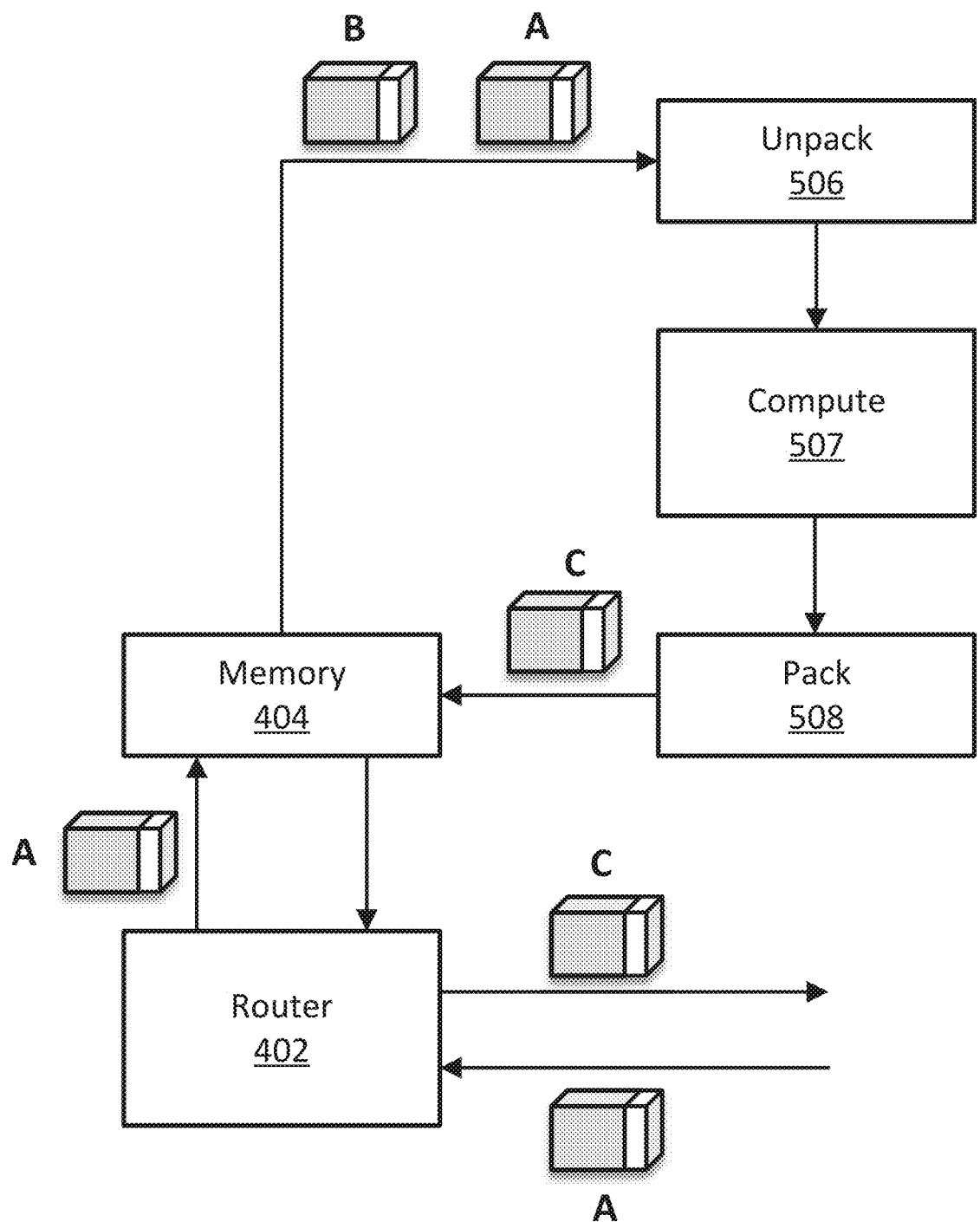
FIG. 5 is a block diagram of a computational node in the form of a processing core with a pipeline bracketed by a packing block and an unpacking block in accordance with specific embodiments disclosed herein.

FIG. 5 illustrates a block diagram 500 that is otherwise in accordance with FIG. 4, but which includes a matched pair of unpack and pack blocks 506 and 508 which bracket the main computation stages of a pipeline, represented by block 507. In embodiments in accordance with FIG. 5, the data in the header and payload could be extracted from packet format in the unpack block 506, and both sets of data could then be applied to the core computational stages of the pipeline for use and modification in those computational stages. In embodiments in accordance with FIG. 5, the data in the header could alternatively be stripped by the unpack block 506 and used solely to control the later stages of the pipeline and be effectively extracted from the main data flow of the pipeline. In specific embodiments of the invention, the unpack block 506 is not needed as the core processing stages operate directly on the content object without the need to extract information from the content object. In specific embodiments of the invention, the unpack block 506 will be responsible for unpacking content objects from a set of content objects, after obtaining data from the memory 404 for the execution of a set of instructions, and the pack block 508 will be responsible for packing content objects from the set of content objects prior to writing data from the processing pipeline to the memory 404.

In specific embodiments of the invention, a compiler can be used to instantiate the data structures and execute a complex computation in accordance with some of the embodiments disclosed herein. In these embodiments, the complex computation may first be represented by application code. The application code could be source code written in human readable format. If the complex computation were a description of a direct graph (e.g., drawing an inference from an ANN), the application code could describe the structure of the directed graph and specify its initial state. The compiler could then be used to parse an application code definition of the directed graph and define, based on the parsing, a set of content objects to contain the directed graph data. The set of content object could be defined using a set of content object identifiers that uniquely identify each content object in the set of content objects. The compiler could further define, based on the parsing, a set of processing core operational codes and a set of operand identifiers to execute the directed graph and a set of operand identifiers. As the compiler has generated both sets of data, the compiler can be configured to assure that the set of operand identifiers is in the set of content object identifiers. In specific embodiments of the invention, the compiler can alternatively generate the set of operand identifiers and set of content object identifiers such that they each unambiguously map back to a set of application datums. The application datums can be variables in the original application code as parsed by the compiler. The compiler can assure that the content object identifiers unambiguously identify the underlying application datums across the set of processing cores while the operand identifiers unambiguously identify the underlying application datums at least across the single processing core on which the associated instructions will be conducted.

In specific embodiments of the invention, the output of a complier can be used to instantiate a directed graph for execution on a set of processing cores. The compiler can also output an assignment of content objects for storage on specific processing cores within the set of processing cores to initialize the directed graph for execution and breakdown the instructions of the application code into instructions for execution on individual processing cores in such a way that the execution of the application code is maximally parallelized with minimal memory latency and such that data movement is optimized for that purpose. To that end, the use of a common language for the routing and computation of data is beneficial in that the compiler can schedule data movement and computation without having to add an additional layer of complexity and translation to said scheduling.

Figure 6:
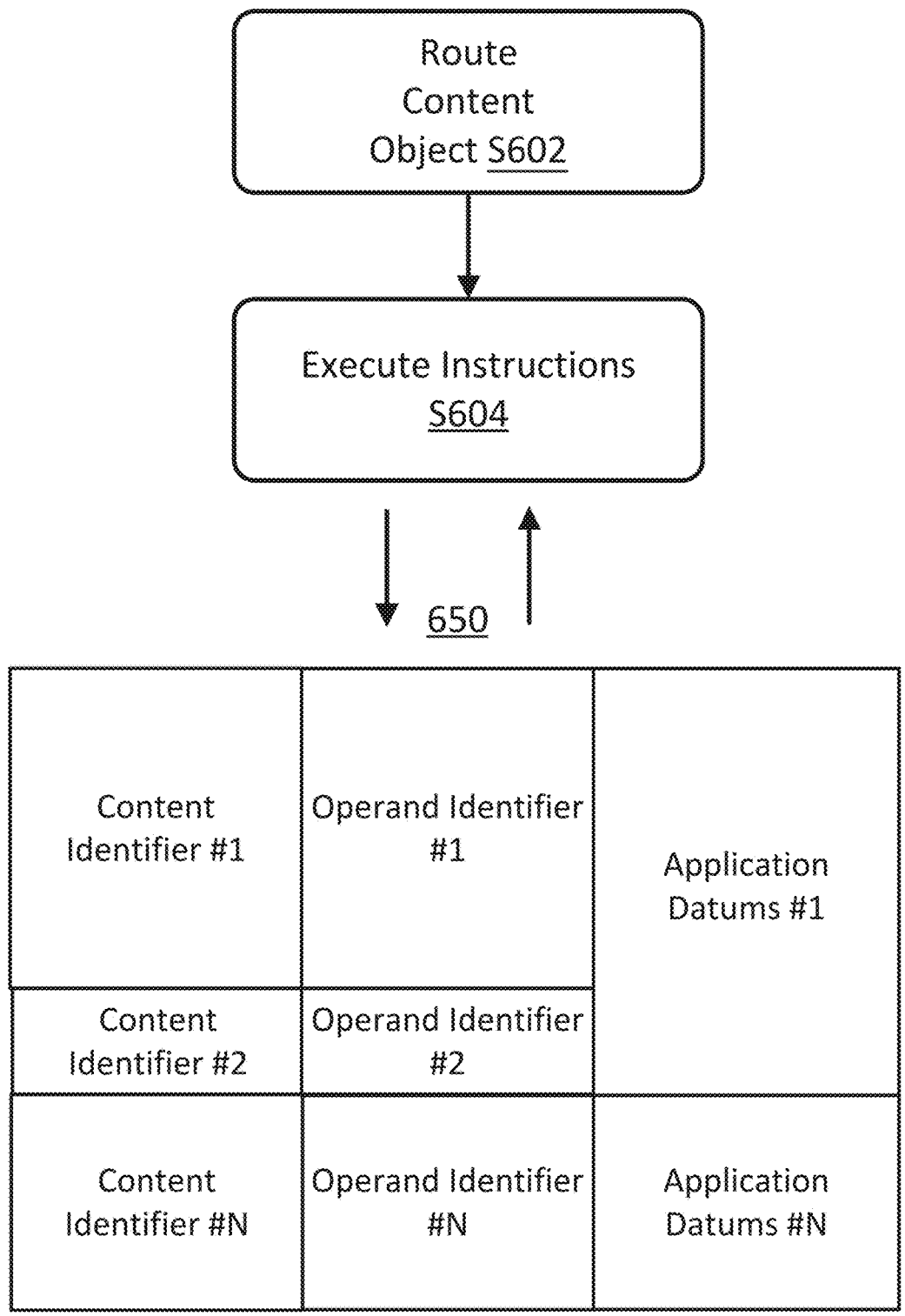
FIG. 6 is a flow chart for a set of methods and schematic representation of a mapping in accordance with specific embodiments disclosed herein.

FIG. 6 illustrates a flow chart 600 for a set of methods for executing a complex computation in accordance with specific embodiments of the present invention. The method can be implemented by using a set of processing cores, such as the NoC described herein. Flow chart 600 starts with step S602 of routing a set of content objects between the set of processing cores. This step can be conducted by a set of routers distributed across the set of processing cores. The routers can include the low-level transmission control hardware as well as the higher level NoC control layer mentioned above with reference to FIG. 3. The set of content objects can be routed by using respective content object identifiers that uniquely identify each content object throughout the processing cores.

Flow chart 600 continues with step S604 of executing a set of instructions. This step can be conducted by the set of processing cores. More specifically, this step can be executed by using a set of processing pipelines distributed across the set of processing cores. The processing pipelines can have the characteristics of the processing pipelines described with reference to FIGS. 4 and 5 and can execute instructions in combination with a processing core controller accessing a cache memory of the processing core. The set of instructions can be defined using a set of operand identifiers. In specific embodiments of the invention, the set of operand identifiers and the set of content object identifiers can be unambiguously mapped to an underlying set of application datums of the complex computation throughout the execution of the complex computation. For example, the set of instructions can be composite computations of the complex computation and the underlying set of application datums can be a set of variables in the complex computation. In specific embodiments of the invention, the content objects can contain a set of operational codes. In those embodiments, the set of operational codes and the set of operand identifiers can define the set of instructions. For example, "A convolution B" can be considered an instruction where "A" and "B" can be considered the operand identifiers, and "convolution" can be considered an operational code. This is a non-limiting example used for the ease of the explanation only. Instructions, and corresponding operand identifiers and operational codes, can be more complex and of a different form.

FIG. 6 illustrates a non-limiting representation of a map 650 in accordance with specific embodiments of the invention. Map 650 is intended to unambiguously map applications datums of the complex computation to the identifiers used when packetizing the data. As explained before, the complex computation could be described at a high level of abstraction by using a reference to a set of application datums. The content object identifiers used to route computation data between processing cores and the operand identifiers used to execute instructions on the processing cores, using that computation data, could each be unambiguously mapped back to the same set of application datums.

Map 650 is illustrated as unambiguously mapping content object identifiers and operand identifiers to application datums. For example, a first content object identifier #1, will unambiguously correspond to a first set of application datums #1. At the same time, a first operand identifier #1, will unambiguously correspond to the same first set application datums #1. In the illustrated case, content object identifier #1 and operand identifier #1 both correspond in a one-to-one correspondence such that the operand for an instruction using operand identifier #1 would be the entire contents of the content object corresponding to content object identifier #1. The mapping can be implemented in numerous ways. As explained before, the mapping can be directly stored in a data structure. The mapping can be implemented by the provisioning of content object with specific content object identifiers into memory addresses that will be accessed by operands with specific operand identifiers. The mapping can be implemented by the provisioning of operand data with specific operand identifiers into memory addresses that will be accessed to form content object with specific content object identifiers. The mapping can be dynamically generated by the processing cores based on known calculations and instructions. The mapping can be stored in the form of instructions to be performed by the processing core when receiving a content object. Content objects and operand identifiers can be mapped to intermediate instructions that will ultimately link back to the original set of application datums. In specific embodiments of the invention, as will be described in more detail below, a set of application datums can be mapped to more than one content object identifier and more than one operand identifier. In this way, application datums #1 can correspond to a first content object identifier #1 and a second set of content object identifiers #2. The set of content object identifiers and operand identifiers will be unambiguously mapped to the set of application datums.

In specific embodiments of the invention, the NoC and/or compiler are able to keep track of, or ex ante define, the spatial distribution of the different cores where content objects are being routed to and define content object identifiers and operand identifiers accordingly. In this way, two or more groups of processing cores spatially distinct can make use of the same identifiers while still being unambiguously mapped to a specific set of application datums. Identifiers can then be recycled within a system and the system can be scaled while using a discrete number of identifiers.

In specific embodiments of the invention, the operand identifiers in a set of operand identifiers represent content object identifiers in a set of content object identifiers. The operand identifiers could represent the content object identifiers either directly, by being identical, or indirectly, by being related through a mapping. In specific embodiments of the invention, the operand identifiers can be included in the content object identifier so that the operand identifiers can be identified by an inspection to the content object identifier. In specific embodiments of the invention, the set of operand identifiers and the set of content object identifiers are the same.

Figure 7:
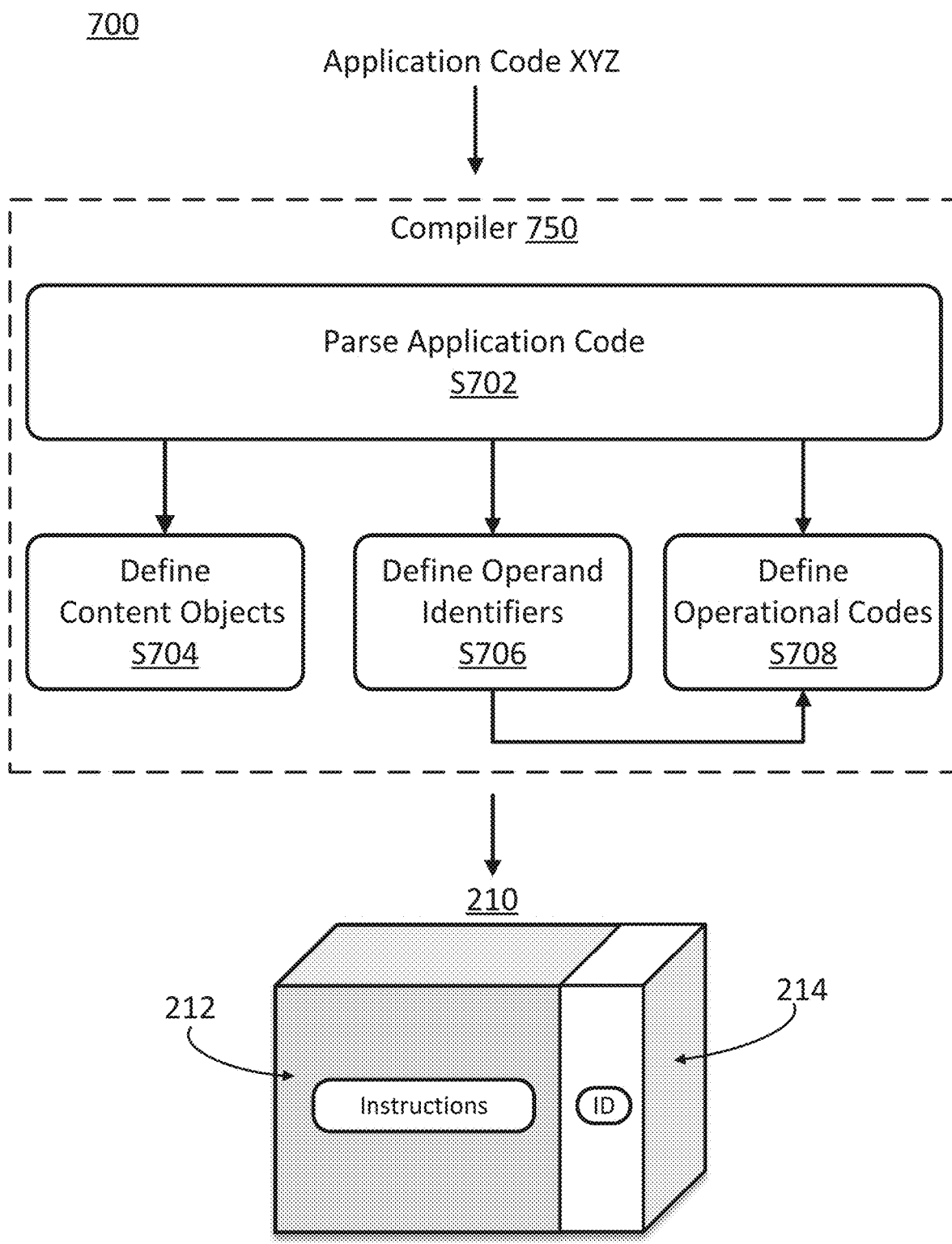
FIG. 7 is a flow chart for a set of methods and illustration of a content objects in accordance with specific embodiments disclosed herein.

FIG. 7 illustrates a flow chart 700 of a set of methods that can be executed by a compiler. The compiler can be a software module that is able to translate code from one language into another. For example, the compiler can translate code from a high-level programming language into a lower lever programming language. The method starts when the compiler 750 receives an application code definition XYZ of the complex computation. The application code definition can be a source code that defines the complex computation. The application code definition can include the underlying set of application datums described with reference to FIG. 6 as variables in the source code. The application code definition can also include application instructions, as operations in the source code, that use the underlying set of application datums as operands.

Flow chart 700 starts step S702 of parsing the application code definition of the complex computation. In this step, the application code can be analyzed and separated in smaller pieces of code easier to process. Based on the parsing, flow chart 700 continues with step S704 of defining a set of content objects, step S706 of defining the set of operand identifiers, and step S708 of defining a set of processing core operational codes to execute the complex computation. As illustrated, steps S704, S706 and S708 can be executed in parallel. However, the steps could be executed sequentially or in any order.

In step S704 a set of content objects for parallelizing the complex computation throughout the processing cores are defined. In this step, content object identifiers can also be defined in order to identify each content object. The compiler can be configured to generate content object identifiers for each content objects from step S704 and include such content object identifiers in the headers of the content objects as they are defined.

In step S706 operand identifiers that characterize a portion of the complex computation are defined. In specific embodiments of the invention, the operand identifiers can be the same as the content object identifiers. In specific embodiments of the invention, the operand identifiers can be included in the set of content object identifiers, for example as a portion or a logic variation of the content object identifier known to the processing cores. In step S708 operational codes that characterize a portion of the complex computation are defined. The operational codes can include the set of operand identifiers as explained before with reference to FIG. 6, and together can represent an instruction to be stored in the content object for execution by the processing cores that receive the content object.

FIG. 7 illustrates an exemplary content object resulting from the compiler processing. The content object can be a packetized content object such as content object 210 of FIG. 2 and can include a header 214 and a payload 212. The header 214 can include the content object identifier as defined by the compiler. The header can also include the operand identifiers or a representation of the operand identifiers. The header can include any information representing the payload and the status of the payload, or any information deemed to be relevant or necessary so as to be represented in the header of the content object. The payload 212 can include the actual content of the content object. The content can be computation data for a complex computation described by the application code. For example, the payload can include the instructions to be executed by processing cores or the data for variables in the application code. In the specific example of FIG. 7, the payload can include the operational code and the operand identifiers defined by the compiler in steps S706 and S708, which can in combination define a set of instructions for the content object.

Multiple content objects such as content object 210 can be defined by the compiler in step S704 as a result of the parsing of the application code definition of the complex computation. A subset of those content objects can be distributed to the processing cores to initialize them for the complex computation. A subset of content objects can contain data values for a single application datum in a set of application datums. In other words, an application datum can be represented by multiple content objects in a set of content objects defined by the compiler after parsing the application code comprising the application datums. Likewise, a subset of instructions can be composite computations for a single application instruction. In this way, the processing cores can execute a set of instructions by executing a subset of instructions on a processing core prior to receiving all the content objects in the subset of content objects at the processing core.

Figure 8:
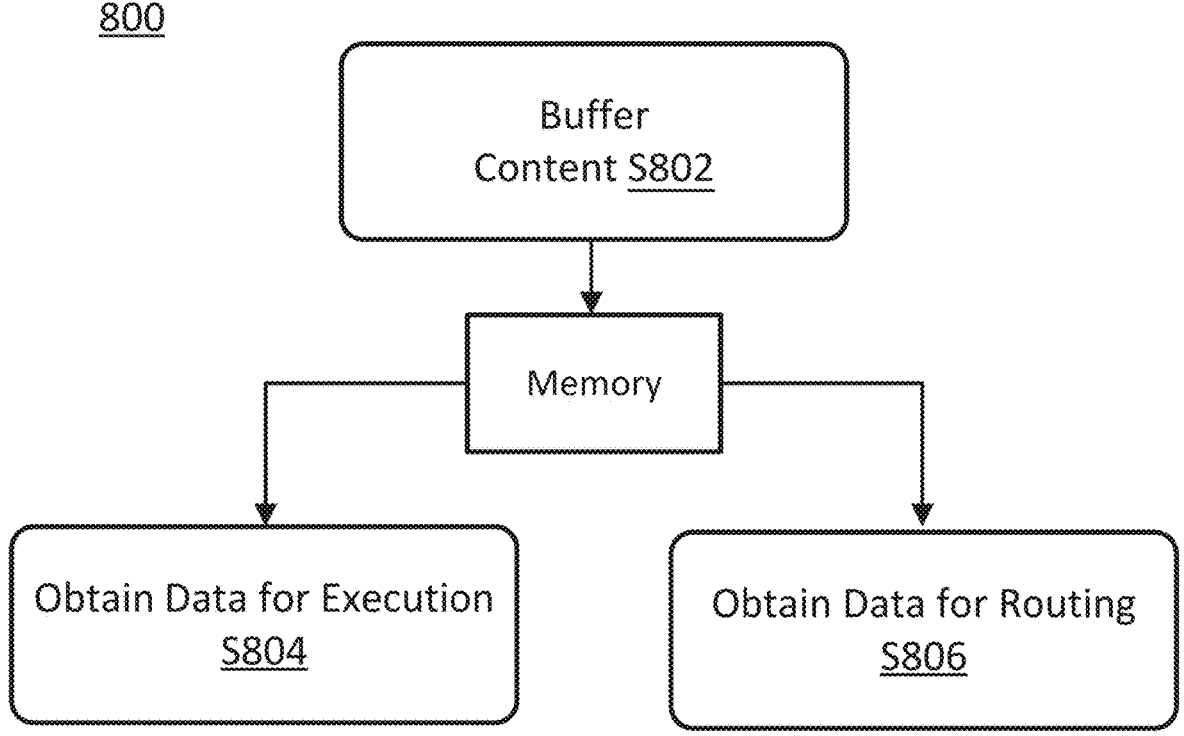
FIG. 8 is a flow chart for a set of methods and schematic representation of a processing core in accordance with specific embodiments disclosed herein.
Figure 8:
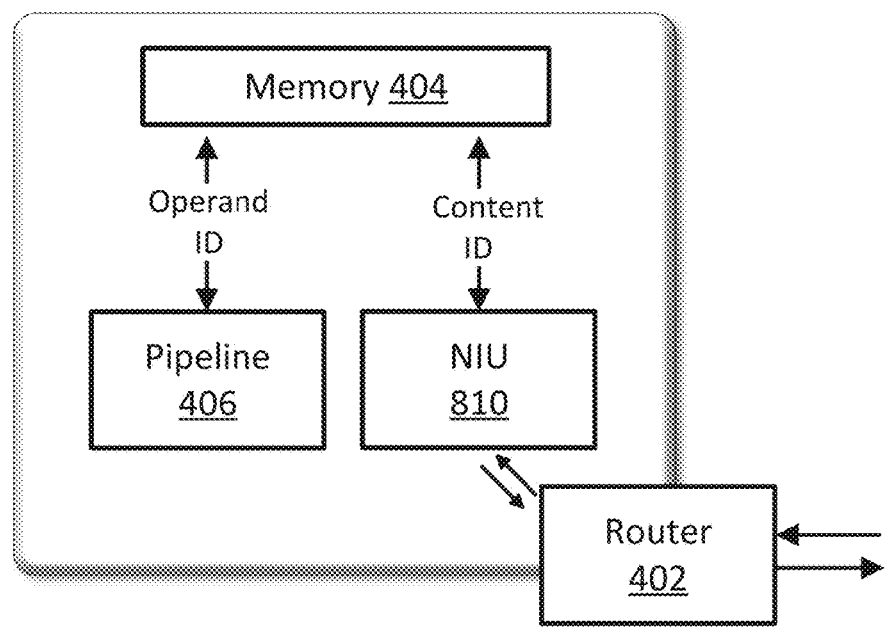

FIG. 8 illustrates a flow chart 800 and a schematic view 850 of a processing core in accordance with specific embodiments of the invention. Flow chart 800 starts with step S802 of buffering a set of content objects in a memory or set of memories distributed across the set of processing cores. This step can be conducted by a memory, such as a cache memory on a processing core, under the instructions of a processing pipeline, processing core controller, router, or NoC layer as described herein. The memories can be the memories internal to each processing core in a NoC such as blocks of SRAM located on the processing cores. The set of content objects can be a set of content objects generated as described with reference to content object 210 in FIG. 7. This step can take place after a set of content objects was defined in step S704 of FIG. 7. This step can take place after the content objects are routed in step S602 in FIG. 6.

Flow chart 800 continues with steps S804 of obtaining data for the execution of a set of instructions from the memory or set of memories. The set of instructions can be a set of instructions as defined with reference to FIG. 6. The set of data for execution of instructions can be stored in memory as part of a content object from the set of content objects. The set of data for execution of instructions can be obtained from memory using the operand identifiers, for example. In specific embodiments of the invention, a set of processing core controllers conduct the obtaining of data for the execution of the set of instructions by providing the content object identifiers to the set of memories. Alternative approaches for the processing pipeline to obtain data for executing instructions described herein can be used in the execution of step S804 such as the accessing of a known memory address in response to the receipt of a flag from a NoC layer or the accessing of a memory address provided by a NoC layer, or the accessing of a memory address associated with an operand identifier in an instruction being evaluated by the processing core controller.

Flow chart 800 also comprises step S806 of obtaining data for the routing of a set of content objects from the set of memories. The set of content objects can be the content objects generated as explained with reference to FIG. 6 and buffered in memory in step S802. The data for the routing can be obtained using content object identifiers.

Schematic view 850 illustrates a memory, such as memory 404 of FIG. 4 and FIG. 5, wherein packets can be buffered. The processing pipelines of the processing core, such as processing pipeline 406 of FIG. 4, can access the memory 404 and obtain data for execution of instructions. As illustrated, the processing pipeline can obtain data from memory by using the operand identifiers. At the same time, NIU 810 in communication with a router associated to the processing core, such as router 402 of FIG. 4 and FIG. 5, can access the same memory 404 and obtain data for routing of content objects. The NIU can be a hardware structure that implements the functionality of the NoC layer as described herein. As illustrated, the data for routing can be obtained by using the content object identifiers. When the operand and content object identifiers are the same, both types of data can be obtained by using a unique identifier. In any case, the identifier used to obtain instructions to be executed by the pipeline of the processing core and the identifier used to obtain data for routing content objects will have the same level of abstraction and ultimately correspond to the original application data defining the complex competition, as described throughout this disclosure.

In specific embodiments of the invention, computation data is routed through a network of computational nodes according to an NDN or CCN paradigm with the content object identifiers mentioned above serving as the names for the computation data being routed by the network. The computation data can be routed through the network using at least one of request messages and solicitation messages transmitted through the network where the request and solicitation messages refer to the computation data. In specific embodiments of the invention, the request and solicitation messages refer to the computation data using the content object identifiers mentioned above. The solicitation messages can be sent by computational nodes that have completed a computation and have generated data that is intended for an alternative computational node. The request messages can be sent by computational nodes that require additional data in order to continue executing their computations. In either situation, the computational nodes can send out the messages without knowing the status of the network in terms of the destination for the computational data or the source location for the computational data. In specific embodiments, the messages do not identify a source or destination for the data associated with the content object identifiers. For example, a request message can be sent out that identifies the computation data that is required and is being requested, but that does not identify a node in the network where the data is located (e.g., a processing core in a set of processing cores). As another example, a solicitation message can be sent out that identifies the computation data that has been generated and is beings solicited, but that does not identify a node where the data is required in the network such as a processing core in a set of processing cores.

Certain benefits accrue to approaches in which the nodes of the network do not need to contain information ex ante regarding either the destination for, or source location of, the computational data that they either require from another node or have generated for use by another node. The benefits spring from the fact that the higher-level components of the system can be further freed from the administration of data. Furthermore, these approaches can lead to reductions in the complexity of the compiler required to produce the instructions for executing the complex computation, or for the compiler to be applied to optimize alternative factors regarding the execution of a complex computation than generating explicit instructions for the transmission of data through the network from node to node. Furthermore, this can lead to benefits in that the instructions for routing the data through the network throughout the course of the complex computation do not need to be stored in or otherwise instantiated by the network and nodes of the network. The computational requirements of tracking the execution of such instructions are also alleviated. Although some of the embodiments discussed below may generate superfluous data as routers keep track of request messages, solicitation messages, destinations for data, and/or destinations for message forwarding, this superfluous data is ephemeral in that it is relevant only to the instantaneous state of the complex computation and application data flow graph and does not need to be retained throughout the entire execution of the complex computation through time. As such, while on a per content object basis the amount of data required to support these approaches may be larger than in the case of a set of fixed routing instructions, the instantaneous amount of data that needs to be retained to support the appropriate flow of data through the network throughout the course of the complex computation may be relatively small. Furthermore, since specific embodiments of the invention disclosed herein will already be applying labels to data which map unambiguously to application datums (e.g., content object and operand identifiers), these specific embodiments are already configured to conduct the data naming tasks that are associated with a networking system based on named data as described below.

Figure 9:
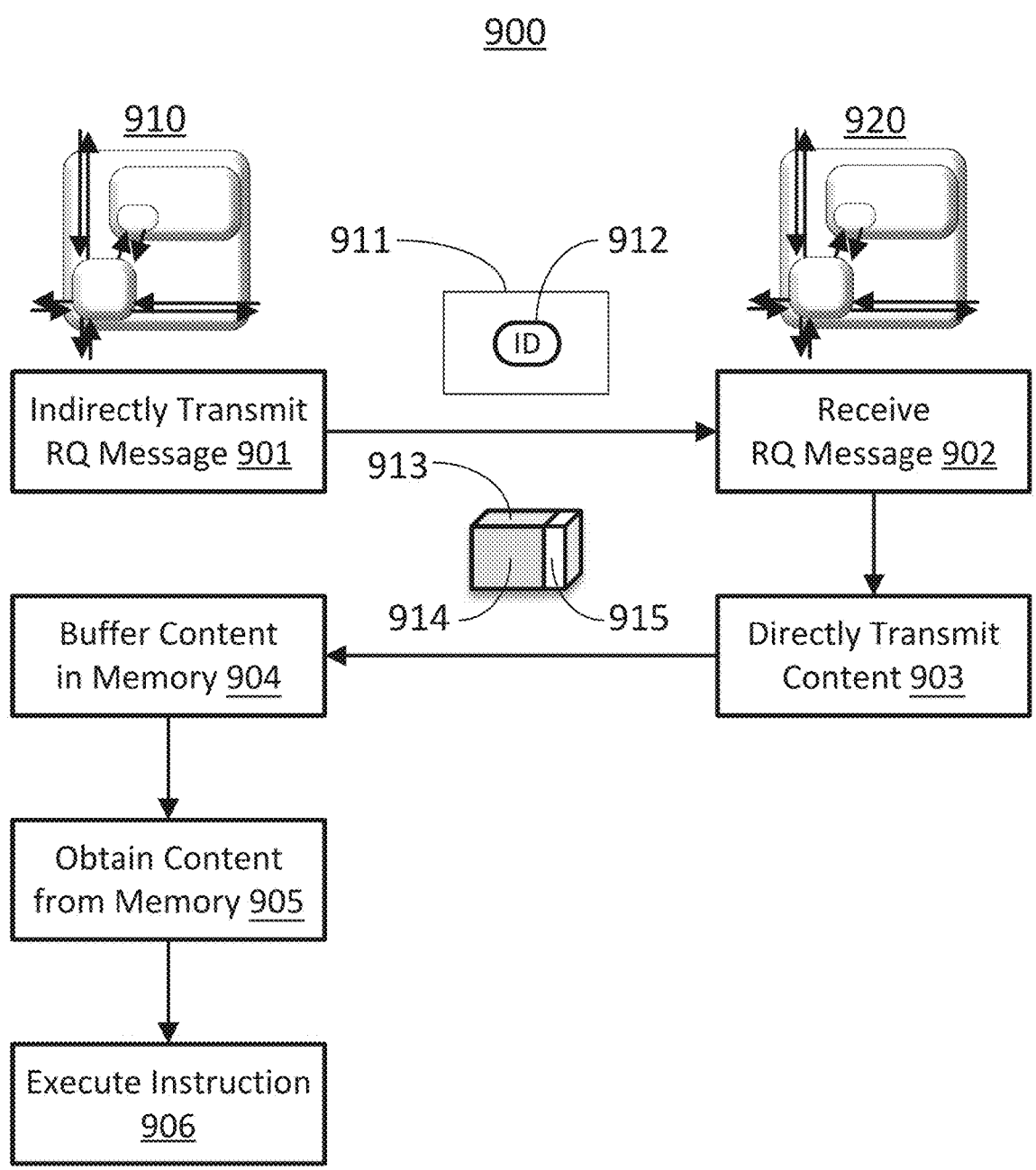
FIG. 9 is a flow chart for a set of methods for routing data packets containing content objects through a network of computational nodes that are executing a complex computation using request messages in accordance with specific embodiments disclosed herein.

FIG. 9 is a flow chart 900 for a set of methods for routing content objects through a network of computational nodes that are executing a complex computation using request messages in accordance with specific embodiments of the inventions disclosed herein. FIG. 9 also includes a block diagram of a first computational node in the form of a processing core 910 and a block diagram of a second computational node in the form of a processing core 920. The flow chart is drawn with respect to these block diagrams so that steps which are aligned underneath the block diagram are executed by the respective computational node.

Flow chart 900 commences with a step 901 of indirectly transmitting, from a first computational node in a set computational nodes to a second computational node in the set of computational nodes, a request message having a content object identifier. The set of computational nodes could be in a network of computational nodes which are conducting a complex computation requiring the exchange of computation data. The content object identifier could identify a content object of computation data required by the first computational node in order to continue with executing the composite computations that have been assigned to the first computational nodes. In the example of FIG. 9, the first computational node is processing core 910 and the second computational node is processing core 920. The request message 911 could include data identifying itself as a request message and include a content object identifier 912. The content object identifier could identify a content object by a string of bits that serves to unambiguously identify the content object with respect to the data in the content object itself as opposed to an address where the content object is located. The content object identifier could identify a specific content object or a set of content objects. For example, the content object identifier could be a prefix or other portion of a set of content object identifiers where the associated set of content objects are intended to be routed together through the network. The request message could also contain a set of content object identifiers that each identify a content object or a set of content objects. The content object identifier and request message do not need to contain any information regarding a location of the content object. Instead, the content object identifier can only be an identifier for the data itself. The transmitting of the request message can be indirect in that it is not addressed to the second processing core or in that it is otherwise sent in a way in which it is not ex ante directed to the second processing core.

Methods for indirect transmission in accordance with this disclosure can take on various forms. Indirect transmission can involve transmissions or broadcasts of request messages from one computational node to other computational nodes and accessing routing tables on those other computational nodes using the request message. The routing tables can include a list of content object identifiers and a corresponding list of computational nodes to which the request message should be forwarded in order to find the content object. The list of computational nodes could be made up of computational nodes that are a single hop from the computational node which maintains the list as opposed to a specific computational node on which the data is available. In other words, the list of computational nodes could only include alternative computational nodes that the computational node can directly communicate with. Upon receiving the request message, if the routing table includes the content object identifier, or a root portion of the content object identifier, the computational node can forward the content object to the associated computational node in the routing table. If the routing table does not include the content object identifier, the computational nodes can follow a default forwarding pattern such as forwarding by a broadcast to all nodes that are a single hop from the computational node besides the node from which the request was received. More complex forwarding patterns can be used in different embodiments of the invention.

In the situations described above in the prior paragraph in which the computational node forwards the request message, either through identifying a computational node in the routing table or by following a default forwarding pattern, the process of checking the routing table can be preceded by determining if the content object identified by the content object identifier in the request message is locally available as described below. If the content object is locally available, the computational node can directly transmit the content object back to the computational node that initially sent the request message using the direct transmission methods described below. If the content object is not located on the computational node and the computational node forwards the request message, the computational node can be referred to herein as an intermittent computational node.

Flow chart 900 continues with a step of receiving, at a second computational node in the set of computational nodes, the request message. The second computational node can be the computational node that generated the data associated with the content object that is identified by the content object identifier in the request message. Alternatively, the second computational node can be a computational node that received the content object that is identified by the content object identifier and has stored the content object locally. For example, processing core 920 may have conducted a composite computation, as part of a complex computation, which generated data that is identified by content object identifier 912 and which is required by processing core 910 in order for processing core 910 to conduct a composite computation that is part of the same complex computation. Processing core 920 may conduct step 902 of receiving at processing core 920, the request message 911.

In specific embodiments of the invention, the receiving of the request message at the second computational node can be conducted in various ways. Receiving the request message at the second computational node can involve a similar process to that conducted by the intermittent nodes involved in the indirect transmission of the request message to the second computational node except the second computational node will identify that the content object is available on the second computational node or will determine that the content object will soon be made available on the second computational node. For example, the second computational node could include an additional routing table similar to the one described above which includes entries for content objects that have been generated by the computational node itself and stored locally. The table could be a content object routing table with entries where each entry corresponds to a specific content object and an identification of what nodes have registered interest in the content object via request messages, whether the content object is available locally, or what nodes have advertised availability of the content object in a solicitation message. The same routing table can be used to route request messages and content objects and the list of computational nodes could include an identification of the node itself (i.e., the routing table on processing core 920 could include content object identifier 912 associated with an identification of processing core 920 itself). In these embodiments, each computational node could access the routing table as soon as a content object was received and determine if the content object was locally available, would be available locally in the future, should be routed to a specific computational node or group of nodes, or should be routed according to a default pattern.

In embodiments in which the computational node maintains a data structure which identifies content objects that are locally available or that will be locally available in the near future, the structure can be maintained in various ways. For example, a controller of the computational node could be configured to update this data structure with entries associated with local data. The controller could be designed to only list data in content objects that would be required remotely in these lists and not update either list with data in content objects that would be entirely generated and consumed locally. The second data structure could be accessed prior to accessing the routing table to see if the data that is associated with request message 911 was available locally. Regardless of the approach used, if the computational node determines that the data is available locally or will be available locally in the future, the request message will not be forwarded and instead the process will continue to a direct transmission of the content object back to the computational node that initially sent out the request message.

Flow chart 900 continues with a step 903 of directly transmitting, from the second computational node to the first computational node, a content object in response to receiving the request message. For example, processing core 920 could directly transmit a content object 913 from processing core 920 to processing core 910 in response to receiving request message 911. Methods for direct transmission in accordance with this disclosure can take on various forms. Direct transmission can involve a retracing of the request message from the second computational node back to the first computational node. For example, the computational nodes can each include a content object routing table which keeps a list of which computational node they received specific request messages from stored along with a corresponding list of the content object identifiers in those request messages. Upon receiving the content object, the computational nodes could then check the content object routing table and transmit the packet to the computational node that they received the request message from. The table could be built and accessed using the content object identifier. The content object identifier can be used in this manner because in specific embodiments of the invention the content object identifier will be part of the content object. For example, the content object could be a content object 913 with a payload 914 and a header 915 where the content object identifier 912 is in the header 915. The content object identifier can then be accessed in a request message to build the content object routing table and accessed again when receiving the content object to utilize the table. Upon receiving a content object and servicing a request message in this way, the content object routing table could be updated to remove the entry. In alternative embodiments, direct transmission of the content object can be conducted using an identification of the first computational node. For example, the request message could include an identification of the first computational node such as an address of the first computational node, and the second computational node could use that identifier to return the content object to the first computational node using the identification of the first computational node.

Flow chart 900 continues with a step 904 of buffering a content object on a memory on the first computational node using a memory address. The memory can be the main memory of the computational node. The memory could be the working memory of the computational node that stores data for access by the processing units of the computational node for conducting the composite computations on the computational node. For example, the computational node could be processing core 910 and the memory could be a cache memory of the processing core which stores the computational data of the processing core to be used as operands for computations conducted by the processing pipeline of the processing core and to be stored as the products of those computations. The data could be stored with reference to a content object identifier such that a controller of the computational node could use the content object identifier to access the data from a memory address in the memory for use as an operand or could record the content object identifier with respect to a memory address in the memory for storage as a product of a computation. Any of the approaches discussed above, such as with respect to memory 404, regarding the concordance of operand identifiers, content object identifiers, and memory addresses could be used to implement step 904.

Flow chart 900 continues with a step 905 of obtaining the content object from the memory using an operand identifier. The step can involve the standard processes associated with accessing data from a main memory of a computational node in order to obtain data for computations. In embodiments in which the computational node is a processing core, the step can involve a core controller reading an instruction from an instruction stack, accessing the operand identifiers in the instructions, and accessing the main memory of the processing core using the operand identifier. In specific embodiments of the invention, the operand identifier can be the content object identifier. In specific embodiments of the invention, the operand identifier and the content object identifier can both be unambiguously mapped to an underlying set of application datums. In specific embodiments of the invention the operand identifier can represent the same content object as is identified by the content object identifier. Any of the approaches discussed above, such as with respect to step S414, regarding the accessing of data from memory 404, could be used to implement step 904.

Flow chart 900 includes a step 906 of executing an instruction on the computational node to conduct the composite computation. For example, the step can include executing an instruction using a processing pipeline on the processing core 910, wherein the instruction includes the operand identifier. The operand identifier can have the same characteristics as described above and the same relationship to the content object identifiers described above. In specific embodiments of the invention, the content object identifier will be the same identifier in the request message and the header of the content object as it is routed through the network and will also be the operand identifier in the instruction executed by the first computational node. In specific embodiments of the invention, the content object identifier will also be associated with the memory address at which the content object is buffered on the first computational node.

Figure 10:
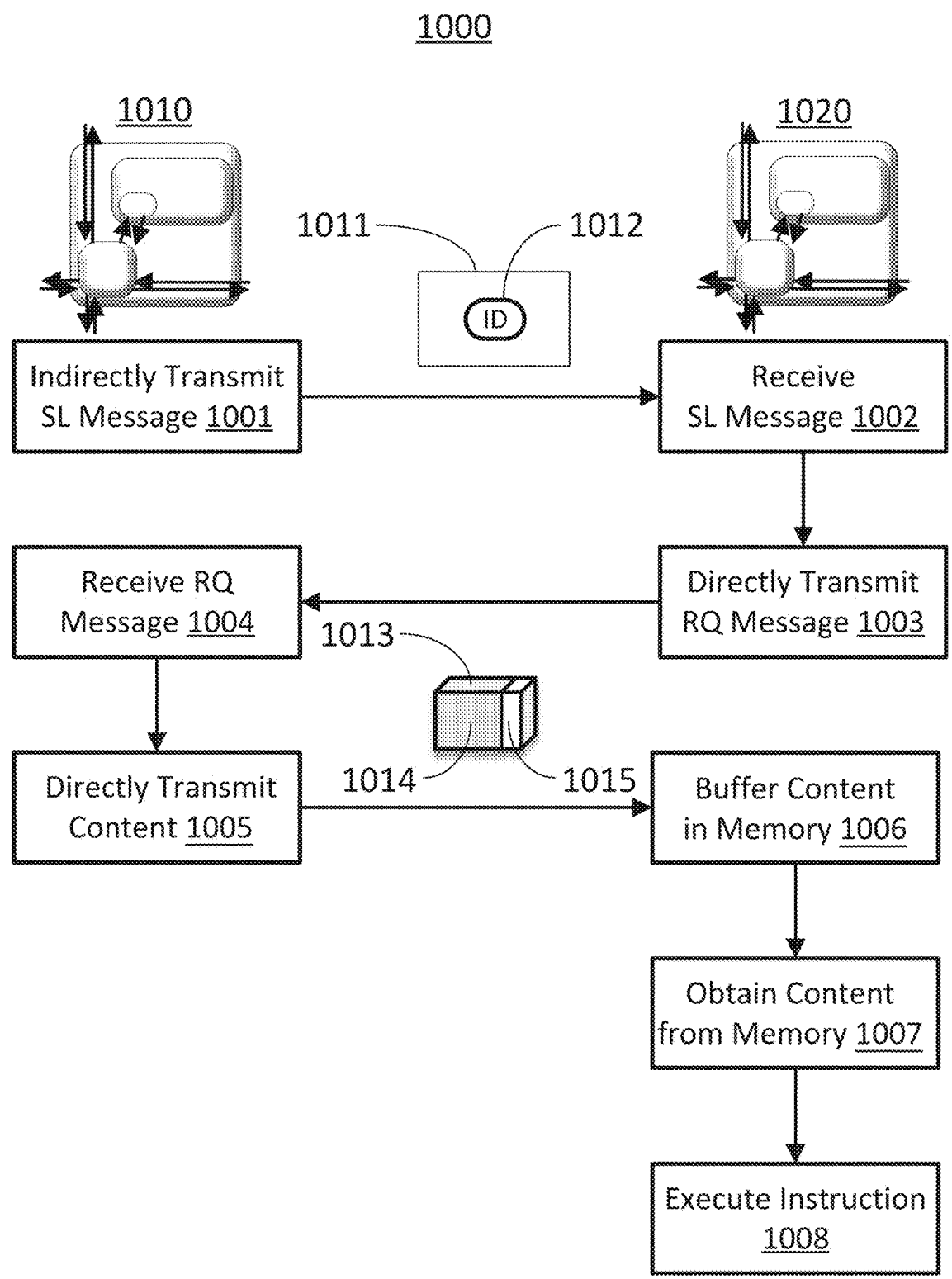
FIG. 10 is a flow chart for a set of methods for routing data packets containing content objects through a network of computational nodes that are executing a complex computation using solicitation messages in accordance with specific embodiments disclosed herein.

FIG. 10 illustrates a flow chart 1000 for a set of methods for routing content objects through a network of computational nodes that are executing a complex computation using solicitation messages in accordance with specific embodiments of the inventions disclosed herein. FIG. 10 also includes a block diagram of a first computational node in the form of a processing core 1010 and a block diagram of a second computational node in the form of a processing core 1020. The flow chart is drawn with respect to these block diagrams so that steps which are aligned underneath the block diagram are executed by the respective computational node.

Flow chart 1000 commences with a step 1001 of indirectly transmitting, from a first computational node in a set of computational nodes, a solicitation message having a content object identifier. For example, processing core 1010 can transmit a solicitation message 1011 having a content object identifier 1012. The solicitation message can identify data available on the first computational node in order for alternative computational nodes, such as the second computational node, to continue to execute the component computations they have been assigned. The data may be required by more than one alternative computational node. In accordance with specific embodiments of the invention disclosed herein, the solicitation message can be sent out without knowledge, on behalf of the first computational node, as to where the requested data is required in the network of computational nodes. The first computational node therefore just needs to know that the generated data is required elsewhere in the system and transmit the solicitation message in response to the generation of the data. The solicitation message 1011 and the indirect transmitting of that message can have similar characteristics to request message 911 and the indirect transmitting of that message. For example, intermittent nodes may keep a routing table which can be accessed using the content object identifier from the solicitation message in order to determine if the solicitation message should be forwarded to a specific node or set of nodes, or if the solicitation message should be forwarded according to a default pattern.

In specific embodiments of the invention, the content objects routing table and/or the routing tables for solicitation and request messages on each intermittent node of the network of computational nodes can be built using both received solicitation messages and request messages, using only request messages, or using only solicitation messages. In embodiments using both types of messages, the routing table can keep track of which node sent a solicitation message and forward a subsequently received request message for the same content object to that node. Likewise, in the same embodiments, the routing table can keep track of which node sent a request message and forward a subsequently received solicitation message for the same content object to that node.

In specific embodiments of the invention, the routing tables can be built using various approaches. For example, a computational node can keep track of where it forwarded a content object and update the routing table to forward any subsequently received request message for that content object to the same node. As another example, a solicitation message received from a first computational node at an intermittent computational node can update the routing table on the intermittent computational node so that any subsequently received request message is forwarded to that first computational node. As another example, a computational node can keep track of where it received a request message from and update the routing table to forward the content object indicated by that request message to the computational node it received the request message from.

In specific embodiments of the invention, the various routing tables disclosed herein can be updated in various ways. For example, a computational node can remove an entry from a content object routing table which was created in response to a request message after forwarding the content object to the node the provided a request message. As another example, a computational node can remove an entry from a routing table which was created in response to a solicitation message after forwarding the solicitation message to a computational node that send a request message for the same data. As another example, the routing tables may also operate on a first in first out policy with a maximum number of entries set by an expected volume of content objects that are to be instantaneously in transmit between the computational nodes in the network.

Flow chart 1000 continues with a step 1002 of receiving, at a second computational node in the set of computational nodes, the solicitation message. The second computational node can be processing core 1020. As in FIG. 9, processing core 1010 and processing core 1020 could be cooperating in the execution of a complex computation in which each is executing a set of component computations of that complex computation, and in which processing core 1010 has executed a component computation to generate computation data that is required by processing core 1020 in order for processing core 1020 to continue its component computations. Additionally, as with step 902 above, step 1002 can be conducted using a procedure conducted by all computational nodes that receive the solicitation message with the exception that processing core 1020 is configured to recognize that it requires the data references by the solicitation message. This step can be conducted using a separate data structure maintained by processing core 1020 indicating which content objects are required by the computational node. Alternatively, the same routing table can be used as is used to keep track of solicitation or request messages with an entry indicating that the content object is required locally.

Flow chart 1000 continues with a step 1003 of directly transmitting, from the second computational node to the first computational node, a request message in response to receiving the solicitation message. Direct transmitting of the request message can be conducted similarly to the direct transmitting of the content object in step 903 above. In specific embodiments, the request message can be routed back using the routing table trail left by the indirect transmission of the solicitation message. In alternative embodiments, the request message can be routed back using an address of the first computational node which was transmitted along with solicitation message 1011. In specific embodiments, the request message can be routed back using either approach mentioned above and can result in the routing table entry for the solicitation message being removed from the intermittent nodes and replaced with a routing table entry for the request message.

Flow chart 1000 also includes a step 1004 of receiving, at the first computational node (e.g., processing core 1010), the request message. In specific embodiments of the invention, step 1004 can be conducted using the same process as was used for step 902 in flow chart 900.

Flow chart 1000 also includes a step 1005 of directly transmitting a content object from a first computational node (e.g., processing core 1010) to a second computational node (e.g., processing core 1020), a content object in response to receiving the request message. The content object can be content object 1013 having header 1015 and payload 1014. The characteristics of the content object can be similar to those of content object 913. In specific embodiments of the invention, step 1005 can be conducted in the same manner as step 903 in FIG. 9.

Flow chart 1000 includes additional steps that can be conducted similarly to corresponding steps in flow chart 900. Step 1006 of buffering the content object on a memory on the second computational node (e.g., processing core 1020) using a memory address. Can be conducted in accordance with step 904 described above. Step 1007 of obtaining a content object from memory using an operand identifier can be conducted in accordance with step 905 described above. Step 1008 of executing an instruction using a processing component of a computational node (e.g., a processing pipeline of the processing core 1020) wherein the instruction includes the operand identifier can be conducted in accordance with step 906 described above.

In specific embodiments of the invention, the routing tables of the computational nodes in a network of computational nodes can represent a state of the forwarding plane of the network of computational nodes. The nodes can each maintain a state of interest in content objects, availability of content objects, or both. Interest in a content object can be determined from the receipt of request messages for that content object. The nodes can also buffer content objects locally for delivery in response to interest received from other nodes even if those content objects were not produced by computation on the node that buffers the packet. Interest can be registered in a data structure such as a routing table upon receiving a request message. Availability can be registered in a data structure such as a routing table upon receiving a solicitation message. In specific embodiments of the invention, if additional requests are received for the same content object before the content object is received, the routing table can be updated with the additional nodes that provided the requests, but the request does not need to be forwarded again.

Upon receiving a content object, the computational node may engage in a default pattern of forwarding the packet towards interest in the content object. In these embodiments, forwarding the content object can be conducted in a multicast fashion if multiple nodes have registered interest in the content object. Forwarding the data in response to the content object can result in a removal of the interest from the routing table. However, in specific embodiments in which a request message identifies multiple content objects, the interest from the routing table can have a countdown value and only be removed from the routing table when a number of associated content objects equal to that countdown value have been received and forwarded.

In specific embodiments of the invention, the computational nodes can also keep track of priority values for specific content objects. The priority value can be indicated in the request message or solicitation message and be stored in a data structure such as a routing table to set the state of the computational node. In specific embodiments, requests with a high priority value may be served before other requests even if the content objects associated with those other requests are received before them. In specific embodiments, responses to solicitation messages with a high priority value may be forwarded before other responses even if they are received first.

In specific embodiments of the invention, the hardware for transmitting the request messages, the solicitation messages, or both, can be the same hardware as is used to transmit the content objects. In these embodiments, the request messages, the solicitation messages, or both can also be content objects routed by a network that links the computational nodes. For example, the messages and content objects can both be content objects routed by a NoC of a set of processing cores. In alternative embodiments, different hardware may be used to route the messages and the content objects. For example, dedicated control lines may link nodes in the network (e.g., physically adjacent nodes) that are used to provide signals indicative of the request messages, the solicitation messages, or both. One dedicated control line could be for request messages. In these embodiments, it would be possible to have the message solely be a string of bits equivalent to the content object identifier, as the hardware configuration of the network would inherently identify the type of message as a request message and the source of interest as the adjacent computational node. In embodiments in which solicitation messages and request messages were both used, a single control line could be used for both with a bit to distinguish the two types of messages from each other or two separate control lines could link each adjacent computational node so that the type of message could be inferred from the control line on which it was received.

Figure 11:
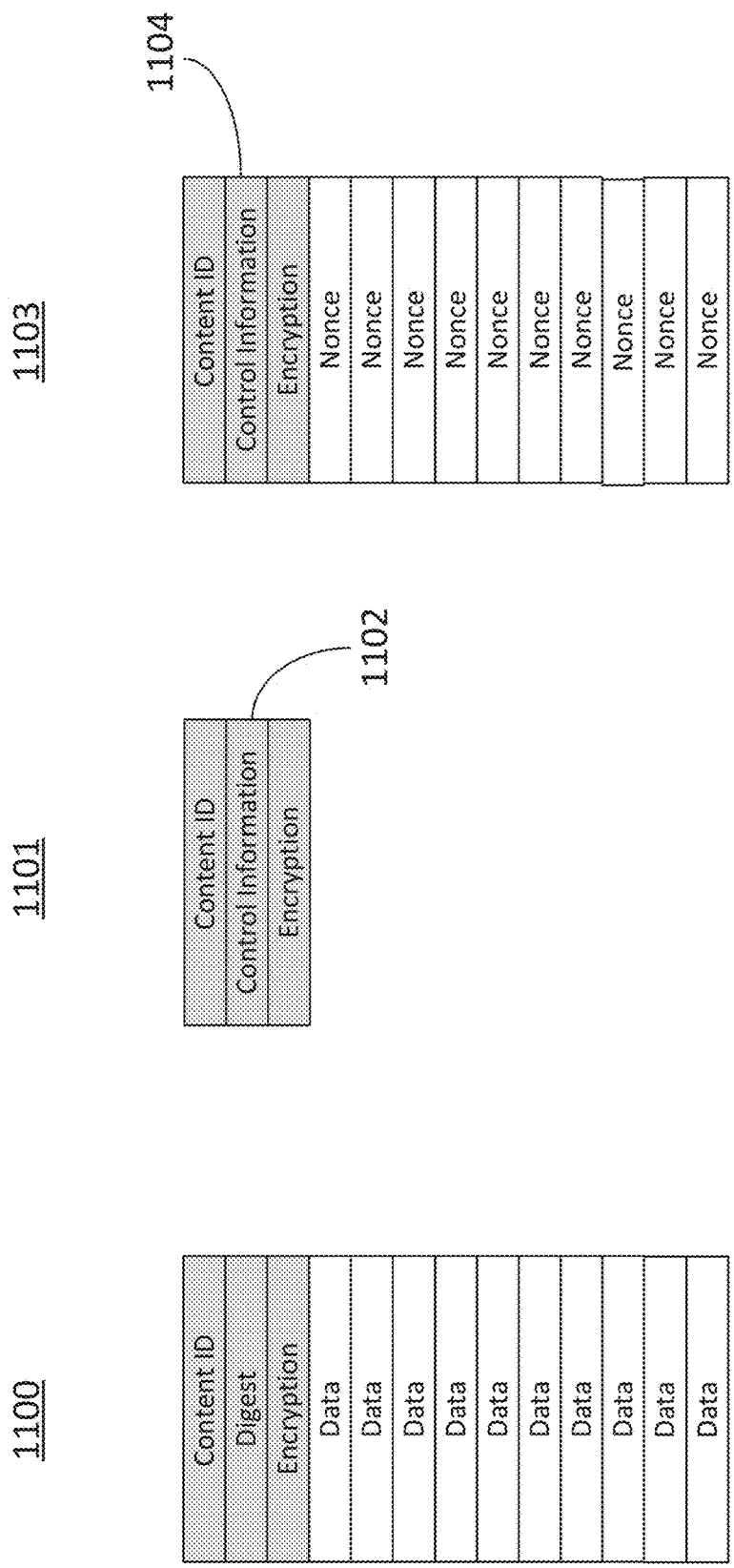
FIG. 11 provides a block diagram of three kinds of content objects that are in accordance with specific embodiments disclosed herein.

FIG. 11 provides a block diagram of three kinds of content objects that are in accordance with specific embodiments. Block diagram 1100 shows a content object which includes a header and a payload. The header could include various information including information for decrypting the payload, a content object identifier, metadata concerning the payload, and various additional information. Block diagram 1101 shows a request content object which includes a header with a content object identifier, control information 1102, and encryption information. The control information can include one or more of information identifying the content object as a request content object, guidelines for forwarding the content object such as a countdown timer for how long the request should be kept in a routing table, an identification of the node which originally sent the request, and other information. The encryption information can include a certificate identifying a public or secret key to be used in decrypting the content object and validating the source of the content object. The request content object could also include a nonce section for purposes of facilitating the cryptographic security of the interest content object or for standardizing the size of the content objects in the network. For example, block diagram 1103 shows a solicitation content object which includes a header and a payload of nonce information to increase the encryption security for the content object and to standardize content object sizes. Control information 1104 can include information identifying the content objects as a solicitation content object, guidelines for forwarding the content object such as a countdown timer for how long the solicitation should be kept in a routing table, and other information. The solicitation content object could also include a nonce section for purposes of facilitating the cryptographic security of the solicitation content object or for standardizing the size of the content object in the network.

In specific embodiments of the invention, the request and solicitation messages refer to the data using labels that unambiguously map to the application datum identifiers mentioned herein. In specific embodiments of the invention, the content objects identifiers disclosed herein can be generated when compiling the application code for a complex computation to assure that all elements of data which are utilized through the course of the application code can be uniquely identified. In specific embodiments of the invention, the content object identifiers disclosed herein can be generated while executing the complex computation using a naming convention that assures that content object identifiers are unique such as by including a unique identifier for a computational node in every content object generated by the computational node. The naming convention can enforce an unambiguous mapping between the content object identifiers and a set of application datums used in the complex computation. In specific embodiments of the invention, the unambiguous mapping from the content object identifiers to the application datums will remain globally unambiguous, across the computational nodes, throughout the execution of the complex computation. The mapping can be kept globally unambiguous through mutually exclusive temporal use of a given identifier, through the use of mutually exclusive identifiers, through the mutually exclusive localized use of a given identifier, or any combination of these approaches.

In specific embodiments of the invention, the naming convention for the content object identifiers can include a root-and-stem-based data structure in which the content object identifiers have either fixed or variable sizes. The stems could include an identification of the computational node on which the content object was generated and additional stems referring to the application datum to which the content object corresponds at various levels of granularity. Fixed size content objects could be configured with a large enough size that any expected number of content objects in the computation could be accommodated. Variable sized content objects could be named such that they can refer to an unlimited number of content objects.

In specific embodiments of the invention, the content object identifier could be a shared root identifier for a set of content objects. For example, content objects storing computation data from a very large tensor A could all start with bits representing A and then have unique suffixes such as A.X.1 and A.X.2. Again, the number of bits in a content object identifier can be variable to accommodate any naming convention. In such embodiments, each stem of the root could be separated by a unique bit string and the end of the content object identifier could likewise be a unique bit string. This would allow for receiving entities to read the content object despite the unknown size of the content object upon receipt. For example, the end of the content object identifier could be 12 bits of zeroes, a separation between stems of the root identifier could be 12 bits representing 1, and the values 0 and 1 could be reserved and not usable by the content object naming convention. Alternatively, the content object could include control information used to decipher the content object identifier so that it would be possible to read content object identifiers of unknown lengths.

In specific embodiments of the invention, the naming convention for content object identifiers could be designed so that a requesting computational node does not need to know the number of content objects being requested. For example, a request using content object identifier "A" could lead to the return of two content objects A.X.1 and A.X.2 without the requesting node knowing that there were two content objects representing A. Alternatively, in specific embodiments of the invention, the header of a content object may identify how many content objects are associated with a specific root or stem and receipt of the data packet could inform the recipient as to this information. For example, a data content object having a header indicating that three content objects were associated with a specific content object identifier could lead to an intermittent node placing a countdown timer on a request message routing table and not removing the request message from the routing table until all three content objects had been delivered to the associated computational node that initially sent the request message.

In specific embodiments of the invention, the content objects and messages disclosed herein can be encrypted in transit using point-to-point encryption. The content objects and messages can be encrypted using any point-to-point encryption paradigm including secret key encryption and public-private key encryption. In specific embodiments of the invention, each computation node can be issued a private key from a certificate authority and can cryptographically sign the content objects generated by the computational node and encrypt the content objects using a secret or private key or keys. The computational nodes can then share a secret key, public key, or library of public keys to verify and decrypt the content objects when they are received. The secret or public key used for decryption could be a key shared by all the computational nodes on the network, shared by a subset of the computational nodes on the network, or specific to a particular computational node on the network. In embodiments in which the key is not shared by all the nodes on the network, the content object could identify the source of the content object using an unencrypted identifier for the source of the content object. The receiving content object could then use the identifier to determine which secret or public key to utilize to decrypt the remainder of the content object. The packet encryption standard could be Advanced Encryption Standard (AES)-

256. The content object encryption could be used with any kind of symmetric cipher such as 128-bit, 192-bit and 256-bit AES, RSA, SQUARE, CRYPTON, ARIA, Camellia, Data Encryption Standard (DES), Triple Data Encryption Standard/Algorithm (3DES/3DEA), Blowfish, Serpent, Twofish, Threefish, Secure and Fast Encryption Routine (SAFER), International Data Encryption Algorithm (IDEA), Tiny Encryption Algorithm (TEA), extended TEA (XTEA), and others. Individual computational nodes can engage in a handshake when they are added to the same network. The handshake can involve the generation of a shared secret at both devices using a Diffie-Hellman key exchange. Specifically, the key exchange can be an Elliptic curve Diffie-Hellman Ephemeral (EcDHE) key exchange. In specific approaches, the cipher mode can be Galois/Counter Mode (GCM) to provide both packet by packet data integrity check and data encryption with replay protection. However, the cipher mode could also involve encryption via other means and the application of a hash-based message authentication code (HMAC) for data integrity.

The method steps disclosed herein can be executed by an individual core in a set of processing cores. In specific embodiments of the invention, each individual processing core can execute a part of a method and the overall method can be an emergent property of the plurality of processing cores. The complex computation can then be executed by one or more processing cores acting individually or in combination. In specific embodiments of the invention, a set of processing cores stores executable instructions in a set of non-transitory computer-readable media which, when executed by the set of processing cores, cause the set of processing cores to execute the methods disclosed herein. The executable instructions can be generated by the compilers disclosed herein. The executable instructions can be executable by the set of processing cores at multiple layers of a software and hardware stack of the set of processing cores. For example, the executable instructions can include source code, embedded code, microcode, hard coded logic instantiated in hardware, and others. The statements in this paragraph regarding individual processing cores in a set of processing cores also hold true for individual computational nodes in a set of computational nodes.

While the specification has been described in detail with respect to specific embodiments of the invention, it will be appreciated that those skilled in the art, upon attaining an understanding of the foregoing, may readily conceive of alterations to, variations of, and equivalents to these embodiments. Although examples in the disclosure where generally directed to drawing inferences from ANNs, the same approaches could be utilized to assist in the distribution of any complex computation. These and other modifications and variations to the present invention may be practiced by those skilled in the art, without departing from the scope of the present invention, which is more particularly set forth in the appended claims.

What is claimed is:

1. A method, wherein each step is conducted by a set of processing cores executing a complex computation, comprising:
   indirectly transmitting, from a first processing core in the set of processing cores to a second processing core in the set of processing cores, a request message having a content object identifier;
   receiving, at the second processing core in the set of processing cores, the request message;
   directly transmitting, from the second processing core to the first processing core, a content object in response to receiving the request message;
   buffering the content object on a memory on the first processing core using a memory address;
   obtaining the content object from the memory using an operand identifier; and
   executing an instruction using a processing pipeline on the first processing core, wherein the instruction includes the operand identifier.

2. The method of claim 1, wherein:
the request message does not identify a processing core in the set of processing cores.

3. The method of claim 1, wherein:
the content object identifier and the operand identifier are the same.

4. The method of claim 1, wherein indirectly transmitting the request message comprises:
   routing the request message through a subset of processing cores in the set of processing cores; and
   adding a set of entries to a set of content object routing tables with the content object identifier while routing the request message through the subset of processing cores.

5. The method of claim 4, wherein directly transmitting the content object comprises:
   checking the set of content object routing tables for the content object identifier on the processing cores in the subset of processing cores; and
   routing the content object through the subset of processing cores using the set of content object routing tables.

6. The method of claim 1, further comprising:
   directly transmitting, from the second processing core to the first processing core, a set of content objects in response to receiving the request message;
   wherein the content object identifier identifies the set of content objects.

7. The method of claim 6, wherein:
the content object identifier is a shared root identifier for the set of content objects.

8. The method of claim 1, wherein:
the content object identifier is from a set of content object identifiers;
the operand identifier is from a set of operand identifiers;
the set of operand identifiers are unambiguously mapped to an underlying set of application datums of the complex computation throughout the executing of the complex computation; and
the set of content object identifiers are unambiguously mapped to the underlying set of application datums of the complex computation throughout the executing of the complex computation.

9. The method of claim 8, wherein:
the content object is from a set of content objects;
the instruction is from a set of instructions;
the set of instructions define composite computations of the complex computation; and
the underlying set of application datums are a set of variables in the complex computation.

10. The method of claim 9, wherein:
the set of content objects contain data values for the underlying set of application datums; and
the set of instructions are executed using the data values for the underlying set of application datums.

11. The method of claim 9, further comprising:
parsing an application code definition of the complex computation;

defining, based on the parsing, the set of content objects, the set of content objects including the content object;

defining, based on the parsing, the set of operand identifiers; and defining, based on the parsing, a set of processing core operational codes to execute the complex computation;

wherein the set of instructions are the set of processing core operational codes combined with the set of operand identifiers.

12. The method of claim 11, wherein:

the transmitting of the request message is conducted using a set of routers distributed across the set of processing cores; and the processing pipeline is in a set of processing pipelines distributed across the set of processing cores.

13. The method of claim 12, wherein:

the memory is in a set of memories distributed across the set of processing cores;

the set of memories are blocks of static random access memory located on the set of processing cores; and a processing core controller conducts the obtaining of the content object from the memory by providing the operand identifier to the memory.

14. The method of claim 13, wherein executing the set of instructions further comprises:

unpacking content objects from the set of content objects, using the set of processing pipelines, after obtaining data from the set of memories for the executing of the set of instructions; and packing content objects from the set of content objects, using the set of processing pipelines, prior to writing data from the set of processing pipelines to the set of memories.

15. The method of claim 1, wherein:

the operand identifier and the content object identifier are commonly mapped to the memory address.

16. A method, wherein each step is conducted by a set of processing cores executing a complex computation, comprising:

indirectly transmitting, from a first processing core in the set of processing cores, a solicitation message having a content object identifier;

receiving, at a second processing core in the set of processing cores, the solicitation message;

directly transmitting, from the second processing core to the first processing core, a request message in response to receiving the solicitation message;

receiving, at the first processing core in the set of processing cores, the request message;

directly transmitting, from the first processing core to the second processing core, a content object in response to receiving the request message;

buffering the content object on a memory on the second processing core using a memory address;

obtaining the content object from the memory using an operand identifier; and executing an instruction using a processing pipeline in the set of processing cores, wherein the instruction includes the operand identifier.

17. The method of claim 16, wherein:

the solicitation message does not identify a processing core in the set of processing cores.

18. The method of claim 16, wherein:

the operand identifier and the content object identifier are commonly mapped to the memory address.

19. The method of claim 16, wherein:

the operand identifier and the content object identifier are the same.

20. A set of processing cores storing executable instructions in a set of non-transitory computer-readable media which, when executed by the set of processing cores, cause the set of processing cores to execute a method comprising:

indirectly transmitting, from a first processing core in the set of processing cores to a second processing core in the set of processing cores, a request message having a content object identifier;

receiving, at the second processing core in the set of processing cores, the request message;

directly transmitting, from the second processing core to the first processing core, a content object in response to receiving the request message;

buffering the content object on a memory on the first processing core using a memory address;

obtaining the content object from the memory using an operand identifier; and executing an instruction using a processing pipeline on the first processing core, wherein the instruction includes the operand identifier.

* * * * *